US011250161B2

(12) United States Patent
Narayanswamy et al.

(10) Patent No.: US 11,250,161 B2
(45) Date of Patent: Feb. 15, 2022

(54) SYSTEMS, METHODS, AND NON-TRANSITORY COMPUTER-READABLE MEDIA FOR SECURE INDIVIDUAL IDENTIFICATION

(71) Applicant: MASTERCARD INTERNATIONAL INCORPORATED, Purchase, NY (US)

(72) Inventors: Raman Narayanswamy, Pelham, NH (US); Przemek Praszczalek, Irvington, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 161 days.

(21) Appl. No.: 16/710,665

(22) Filed: Dec. 11, 2019

(65) Prior Publication Data
US 2020/0193059 A1 Jun. 18, 2020

Related U.S. Application Data

(60) Provisional application No. 62/779,874, filed on Dec. 14, 2018.

(51) Int. Cl.
*G06F 21/62* (2013.01)
*G06F 21/32* (2013.01)

(52) U.S. Cl.
CPC .......... *G06F 21/6254* (2013.01); *G06F 21/32* (2013.01)

(58) Field of Classification Search
CPC ............................. G06F 21/6254; G06F 21/32
See application file for complete search history.

(56) References Cited

U.S. PATENT DOCUMENTS 9,536,065 B2 * 1/2017 Bouse ................. G06F 16/2228
10,142,333 B1 11/2018 Griffin et al.
(Continued)

FOREIGN PATENT DOCUMENTS

| KR | 10-2017-0107409 A | 9/2017 |
| WO | 2018/001831 A1 | 1/2018 |
| WO | 2018/222211 A1 | 12/2018 |

OTHER PUBLICATIONS

International Search Report and Written Opinion for Application No. PCT/US2019/064125 dated Mar. 25, 2020 (11 pages).

*Primary Examiner* — Joseph P Hirl
*Assistant Examiner* — Stephen T Gundry
(74) *Attorney, Agent, or Firm* — Michael Best & Friedrich LLP

(57) ABSTRACT

A privacy-enhancing system, method, and non-transitory computer-readable medium for securely identifying an individual over time without retaining sensitive biometric data. In one embodiment, the system includes a local identity server including an electronic processor, a communication interface, and a memory. The electronic processor is configured to initiate a personalization of a partner-specific identification vehicle that identifies the individual based at least in part on an individual global unique identifier associated with the individual, receive a request for a service from the individual via the communication interface, receive consent and registration information from the individual via the communication interface, generate an identity confirmation that confirms an identity of the individual, and output the identity confirmation via the communication interface. The individual global unique identifier is generated from information derived from the registration information and the individual global unique identifier is not indicative of personally identifiable information (PII) of the individual.

21 Claims, 17 Drawing Sheets

(56) References Cited

U.S. PATENT DOCUMENTS

| | | | |
|---|---|---|---|
| 2015/0033305 A1* | 1/2015 | Shear | G06F 21/6218 |
| | | | 726/6 |
| 2015/0059003 A1* | 2/2015 | Bouse | H04L 63/102 |
| | | | 726/28 |
| 2017/0141920 A1* | 5/2017 | Herder, III | H04L 9/3231 |
| 2017/0142102 A1 | 5/2017 | Toyoshima et al. | |
| 2018/0007060 A1* | 1/2018 | Leblang | G06F 21/32 |
| 2019/0036917 A1* | 1/2019 | Sun | H04L 9/3213 |
| 2019/0089539 A1* | 3/2019 | Dupont | G06K 9/0002 |
| 2019/0220583 A1* | 7/2019 | Douglas | G06F 21/316 |
| 2019/0362129 A1* | 11/2019 | Sandhan | G06K 9/00 |
| 2019/0363889 A1* | 11/2019 | Wang | H04L 9/0643 |
| 2019/0377963 A1* | 12/2019 | Hamid | G06K 9/00268 |
| 2020/0028677 A1* | 1/2020 | Herder, III | H04L 9/3231 |
| 2020/0036707 A1* | 1/2020 | Callahan | H04L 9/3231 |
| 2020/0074059 A1* | 3/2020 | Beckett, Jr. | G06F 21/32 |
| 2020/0092102 A1* | 3/2020 | Wang | H04W 12/06 |
| 2020/0127826 A1* | 4/2020 | Ebrahimi | H04L 9/0894 |
| 2020/0145219 A1* | 5/2020 | Sebastian | H04L 9/3236 |
| 2020/0177598 A1* | 6/2020 | Storr | G06F 21/45 |
| 2020/0228321 A1* | 7/2020 | Krishnamacharya | |
| | | | H04L 63/0428 |
| 2020/0382306 A1* | 12/2020 | Wang | G06F 21/602 |
| 2021/0184857 A1* | 6/2021 | Chen | H04L 63/126 |
| 2021/0334570 A1* | 10/2021 | Hamid | G06F 21/32 |

* cited by examiner

SCENARIO A: REGISTRATION+BIOMETRIC ENROLLMENT OF AN INDIVIDUAL INTO AN AID PROGRAM

USE CASE #5: A 2ND BIOMETRIC MODALITY FOR THE SAME & UNIQUE INDIVIDUAL IS CAPTURED FOR EXAMPLE → A FARMER REGISTERED WITH OXFAM (BY FINGERPRINT) REGISTERS WITH RED CROSS (USING IRIS)

USE CASE #6: A REGISTERED INDIVIDUAL'S ID PROFILE IS UPDATED WITH 2ND BIOMETRIC MODALITY FOR EXAMPLE → A FARMER REGISTERED WITH OXFAM & RED CROSS IS NOW RECOGNIZED AS ONE

SCENARIO B: NON-BIOMETRIC REGISTRATION OF INDIVIDUAL INTO AN AID PROGRAM

USE CASE #7: AN INDIVIDUAL REGISTERS FOR AN ID PROFILE (ACCOUNT) WITH AN NGO FOR EXAMPLE → AN INDIVIDUAL ENROLLS INTO A LIVELIHOODS PROGRAM WITH SAVE THE CHILDREN

USE CASE #9: A TOKEN REPRESENTING A RELATIONSHIP BETWEEN INDIVIDUAL AND NGO #1 IS ISSUED FOR EXAMPLE → A UNIQUE TOKEN IS CREATED ONLY FOR TRANSACTIONS BETWEEN AN INDIVIDUAL & RED CROSS

USE CASE #10: A NEW TOKEN CREATED DURING AN INTERACTION IS MATCHED TO A DESIGNATED TOKEN FOR EXAMPLE → A FARMER'S CARD IS USED TO CREATE A NEW TOKEN THAT MATCHES WHAT RED CROSS HAS ON FILE

SYSTEMS, METHODS, AND NON-TRANSITORY COMPUTER-READABLE MEDIA FOR SECURE INDIVIDUAL IDENTIFICATION

CROSS-REFERENCE TO RELATED APPLICATION

This application claims the benefit of U.S. Provisional Application No. 62/779,874, filed on Dec. 14, 2018, the entire content of which is hereby incorporated by reference.

FIELD OF THE INVENTION

The present disclosure relates generally to secure identification. More specifically, the present disclosure relates privacy-enhancing systems, methods, and non-transitory computer-readable media.

BACKGROUND

A partner-specific identification vehicle (or other form factor) issued to an individual by a partner uniquely identifies the individual to that partner. For example, the partner-specific identification vehicle may contain personally identifiable information (also referred to as "PII") or the partner-specific identification vehicle may access the PII of the individual on the partner's server. In particular, the partner-specific identification vehicle may store an individual's biometric data (one form of PII) or other detailed information that personally identifies the individual.

However, with the increasing number of cyber-attacks on various entities, the risk of exposing the individual's PII is increasing. Once an individual's PII is obtained by a nefarious actor, the risk of an identity theft or fraud on the individual is high because the nefarious actor may use the individual's PII to pretend to be the individual.

SUMMARY

The present disclosure relates to privacy-enhancing systems, methods, and non-transitory computer-readable media that provide for a partner-specific identification vehicle and identifies an individual without compromising or retaining any of the individual's PII. By not comprising any of the individual's PII, the systems, methods, and non-transitory computer-readable media of the present disclosure improve computer security because a nefarious actor cannot commit identity theft or fraud on the individual even after gaining access to information on the individual's partner-specific identification vehicle.

One embodiment of the present disclosure includes a system for securely identifying an individual. The system includes a local identity server including a first electronic processor, a first communication interface, and a first memory. The first electronic processor is configured to initiate a personalization of a partner-specific identification vehicle that identifies the individual based at least in part on an individual global unique identifier associated with the individual, receive a request for a service from the individual via the first communication interface, receive consent and registration information from the individual via the first communication interface, generate an identity confirmation that confirms an identity of the individual, and output the identity confirmation via the first communication interface, wherein the individual global unique identifier is generated from information derived from the registration information, and wherein the individual global unique identifier is not indicative of personally identifiable information (PII) of the individual.

Another embodiment of the present disclosure includes a method for securely identifying an individual. The method includes initiating, with a local identity server, a personalization of a partner-specific identification vehicle that identifies the individual based at least in part on an individual global unique identifier associated with the individual. The method includes receiving, with the local identity server, a request for a service from the individual via a network. The method includes receiving, with the local identity server, consent and registration information from the individual via the network. The method includes generating, with the local identity server, an identity confirmation that confirms an identity of the individual. The method also includes outputting, with the local identity server, the identity confirmation to the network. In this embodiment, the individual global unique identifier is generated from information derived from the registration information, and the individual global unique identifier is not indicative of personally identifiable information of the individual.

Yet another embodiment of the present disclosure includes a non-transitory computer-readable medium comprising instructions that, when executed by an electronic processor, causes the electronic processor to perform a set of operations. The set of operations includes initiating a personalization of a partner-specific identification vehicle that identifies an individual based at least in part on an individual global unique identifier associated with the individual. The set of operations includes receiving a request for a service from the individual via a network. The set of operations includes receiving consent and registration information from the individual via the network. The set of operations includes generating an identity confirmation that confirms an identity of the individual. The set of operations also includes outputting the identity confirmation to the network. In this embodiment, the individual global unique identifier is generated from information derived from the registration information, and the individual global unique identifier is not indicative of personally identifiable information of the individual.

DETAILED DESCRIPTION OF THE EMBODIMENTS

The following description is composed of five different sections. The first section (FIG. 1) highlights an example system for securely identifying an individual. The second section (FIGS. 2-7) highlights the issuance of an identity vehicle using biometrics with no PII revealed by identity vehicle or otherwise collected using the example system of FIG. 1. The third section (FIGS. 8-10) highlights where the issuance of an identity vehicle happens in an environment where there are no biometrics or no biometrics yet, so detailed information is collected instead of using the biometrics of the example system of FIG. 1. The fourth section (FIGS. 11-13) highlights a process for token issuance and matching as part of the process that uses biometrics and the example system of FIG. 1. The fifth section (FIGS. 14-16) highlights an identity network/switch in the second example system of FIG. 14. The last section (FIG. 17) highlights a method for securely identifying an individual with the example system of FIG. 1.

Figure 1:
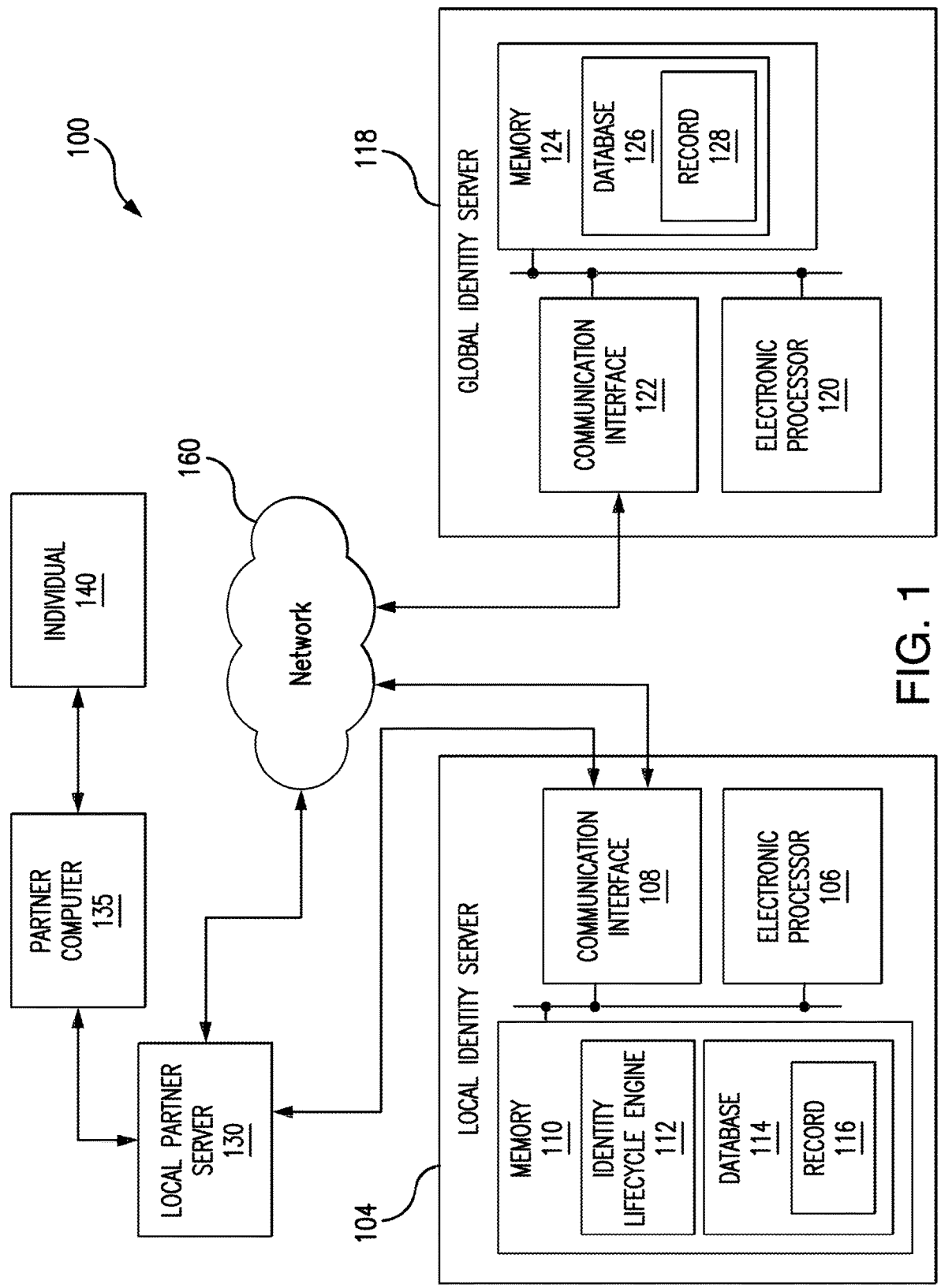
FIG. 1 illustrates an example system for securely identifying an individual.

FIG. 1 illustrates an example system 100 for securely identifying an individual. In the example of FIG. 1, the system 100 includes a local identity server 104, a global identity server 118, a local partner server 130, a partner computer 135, an individual 140, and a network 160.

The local identity server 104 and the global identity server 118 may be owned by, or operated by or on behalf of, an administrator. The global identity server 118 may also be implemented by one or more networked computer servers.

The local identity server 104 includes an electronic processor 106, a communication interface 108, and a memory 110. The electronic processor 106 is communicatively coupled to the communication interface 108 and the memory 110. The electronic processor 106 is a microprocessor or another suitable processing device. The communication interface 108 may be implemented as one or both of a wired network interface and a wireless network interface. The memory 110 is one or more of volatile memory (e.g., RAM) and non-volatile memory (e.g., ROM, FLASH, magnetic media, optical media, et cetera). In some examples, the memory 110 is also a non-transitory computer-readable medium. Although shown within the local identity server 104, memory 110 may be, at least in part, implemented as network storage that is external to the local identity server 104 and accessed via the communication interface 108. For example, all or part of memory 110 may be housed on the "cloud."

The global identity server 118 includes an electronic processor 120, a communication interface 122, and a memory 124. The electronic processor 120 is communicatively coupled to the communication interface 122 and the memory 124. The electronic processor 120 is a microprocessor or another suitable processing device. The communication interface 122 may be implemented as one or both of a wired network interface and a wireless network interface. The memory 124 is one or more of volatile memory (e.g., RAM) and non-volatile memory (e.g., ROM, FLASH, magnetic media, optical media, et cetera). In some examples, the memory 124 is also a non-transitory computer-readable medium. The memory 124 may be, at least in part, implemented as network storage that is external to the global identity server 118 and accessed via the communication interface 122. For example, all or part of memory 124 may be housed on the "cloud."

The identity lifecycle engine 112 may be stored within a transitory or non-transitory portion of the memory 110. The identity lifecycle engine 112 includes machine readable instructions that are executed by processor 106 to perform the functionality of the local identity server 104 as described below with respect to FIGS. 2-13.

The memory 110 may include a database 114 for storing information about individuals. The database 114 may be an RDF database, i.e., employ the Resource Description Framework. Alternatively, the database 114 may be another suitable database with features similar to the features of the Resource Description Framework. The database 114 may include a plurality of records. Each record may be associated with and contain personal information about one individual. For example, in the illustrated embodiment, record 116 may be associated with the individual 1440, and other N records may be respectively associated with one of N other individuals (not expressly shown in FIG. 1).

The local partner server 130 is in data communication with the partner computer 135. The partner computer 135 may be web-compatible mobile computer, such as an Apple laptop, an Android tablet, a Google smart phone, etc. Alternately, or in addition, the partner computer 135 may be a desktop computer. The partner computer 135 includes an electronic processor in communication with memory. In an embodiment, the electronic processor of the computer 135 is also in communication with a biometric scanner and a communication interface. The electronic processor is a microprocessor or another suitable processing device, the memory is one or more of volatile memory and non-volatile memory, and the biometric scanner is one or more biometric scanning devices (e.g., a device that scans fingerprints, facial features, irises, handwriting, et cetera) now known or subsequently developed. The communication interface may be a wireless or wired network interface.

An application, which contains software instructions implemented by the electronic processor of the partner computer 135 to perform the functions of the partner computer 135 as described herein, is stored within a transitory or a non-transitory portion of the memory. The application may have a graphical user interface that facilitates interaction between the individual 140 and the local partner server 130.

The partner computer 135 may include or be in communication with a point of sale system (POS), e.g., a mobile POS system (such as a mobile card reader). As discussed herein, the partner computer 135 may use the mobile POS system to, among other things, read a partner-specific identification asset (not shown and considered to be part of the block "individual 140") associated with the individual 140 to verify the identity of the individual 140.

The partner computer 135 may communicate with the local partner server 130 over network 160. The network 160 is preferably (but not necessarily) a wireless network, such as a wireless personal area network, local area network, or other suitable network. The local partner server 130 may include an Application Programming Interface (API) that allows the individual 140 to communicate with the local partner server 130 via the partner computer 135. The local partner server 130 may directly communicate with the local identity server 104 or indirectly communicate over network 160.

The local partner server 130 has an electronic processor in communication with memory. The electronic processor is a microprocessor or another suitable processing device, and the memory is one or more of volatile memory and non-volatile memory (including memory remote from the partner computer 135 and accessible thereby over a network).

In an embodiment, the memory may include a database and software. The database of the local partner server 130 may include information about individual 140 and other individuals, as set forth herein. The software of the local partner server 130 may facilitate interaction between the local partner server 130 and individuals (e.g., the individual 140) and allow for the local partner server 130 to track the interactions as described in greater detail below.

The local identity server 104 may likewise communicate with partner servers other than the local partner server 130. The term "partner", as used herein, encompasses any other organizations engaging with individuals, including but not limited to non-governmental organizations and other charitable institutions (including governmental organizations). The term "individual", as used herein, encompasses a person (or household) that seeks to interact with an organization or entity, including but not limited to seeking assistance (e.g., a refugee in a refugee camp, a person who receives aid, etc.). The workings of the local identity server 104 and the local partner server 130 will now be described in additional detail with FIGS. 2-13.

With respect to FIGS. 2-7, the system 100 enrolls the individual 140 using biometrics, issues a partner-specific identification asset, and identifies the individual 140 with the partner-specific identification asset and without exposing or compromising any PII regarding the individual 140. With respect to FIGS. 8-10, the system 100 enrolls the individual 140 using detailed information instead of biometrics, issues a partner-specific identification asset, and identifies the individual 140 with the partner-specific identification asset and without exposing or compromising any PII regarding the individual 140. Lastly, with respect to FIGS. 11-13, the system 100 issues a token, verifies that the individual 140 is the cardholder with an on-card biometric verification, and confirms a relationship between the individual 140 and a partner based at least in part on the token and without exposing or compromising any PII regarding the individual 140.

Figure 2:
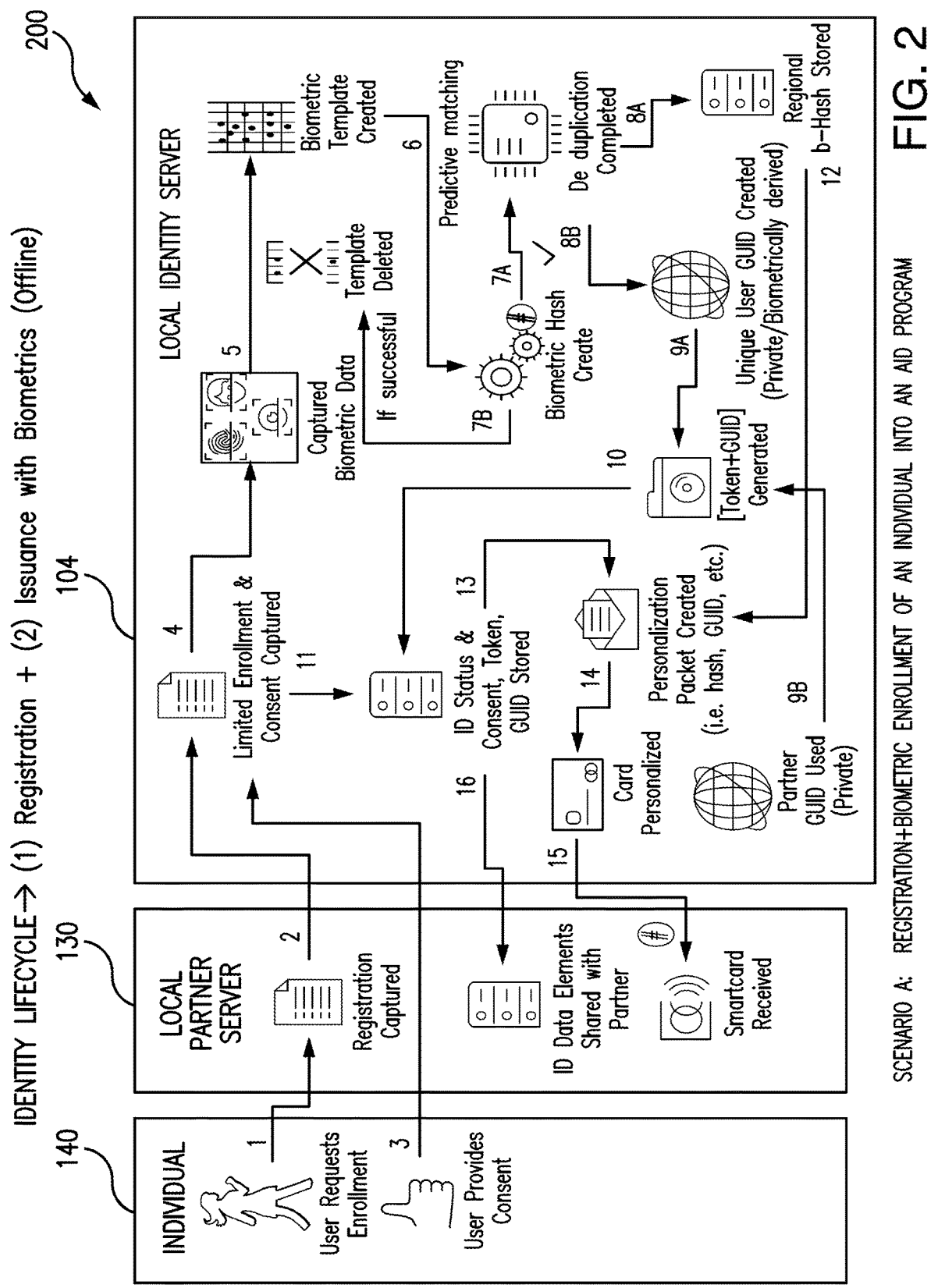
FIG. 2 illustrates a secure identity lifecycle with biometrics.

FIG. 2 illustrates a secure identity lifecycle 200 with biometrics. In the example of FIG. 2, the individual 140 requests enrollment in a program or service offered by a partner via the local partner server 130. For example, the individual 140 may visit the partner to access the partner computer 135 and enroll.

The local partner server 130 captures the registration of the individual 140 and outputs the registration information to the local identity server 104. The individual 140 also indicates consent to the local partner server 130 and/or the local identity server 104.

As part of registering, the individual 140 provides biometric data associated with the individual 140. For example, the individual undergoes a facial scan, a fingerprint scan, an iris scan, or other suitable biometric scan. The biometric data associated with the individual 140 is included in the registration information that is output by the local partner server 130 to the local identity server 104.

The local identity server 104 captures the biometric data (including images) and generates a biometric template based on the biometric data. After generating the biometric template, the local identity server 104 generates a biometrically-derived hash that includes no biometric data (hereinafter referred to as "biometric hash") and clears the biometric image, the biometric template, and any biometric data associated with the individual 140 from temporary memory. That is, once the biometric template is generated, the biometric template temporarily persists in the short-term/cache memory until a successful creation of a hash, which triggers a memory flush. For example, the local identity server 104 may use the Trust Stamp™ technology to generate the biometric hash from the biometric template.

Although not shown in FIG. 2, if the biometric hash is unable to be generated from the biometric template, the local identity server 104 either clears the biometric template from temporary memory and attempts to generate another biometric template from the biometric data or clears both the biometric template and the biometric data from the temporary memory and requests additional biometric data from the individual 140.

After successfully generating the biometric hash, the local identity server 104 performs de-duplication using predictive matching to determine whether the biometric hash matches any existing biometric hashes stored in the database 114. For example, the local identity server 104 may use the Trust Stamp™ technology to perform predictive matching to determine whether the biometric hash matches any existing biometric hashes stored in the database 114. After checking against existing biometric hashes in the database 114, the local identity server 104 either generates a new global unique identifier (GUID) associated with the individual 140 and stores the GUID and the biometric hash in the database 114 or simply stores the biometric hash to an existing GUID associated with the individual 140.

After storing the biometric hash, the local identity server 104 generates a token based on the GUID of the individual 140 and the GUID of the partner associated with the local partner server 130. Upon generating the token, the local identity server 104 stores the identification status of the individual 140, the consent of the individual 140, the token associated with the individual 140, and the GUID associated with the individual 140 in the database 114. The local identity server 104 also shares some of the identity elements with the partner.

After storing all of the information associated with the individual 140 in the database 114, the local identity server 104 generates a personalization packet (e.g., the biometric hash, the GUID, and/or the token) of the individual 140 and initiates the personalization of an identification asset (e.g., an near field communication (NFC) identification card) as well as the delivery of the identification asset to the partner. The above-described enrollment between the individual 140, the local partner server 130, and the local identity server 104 is an offline enrollment.

Figure 3:
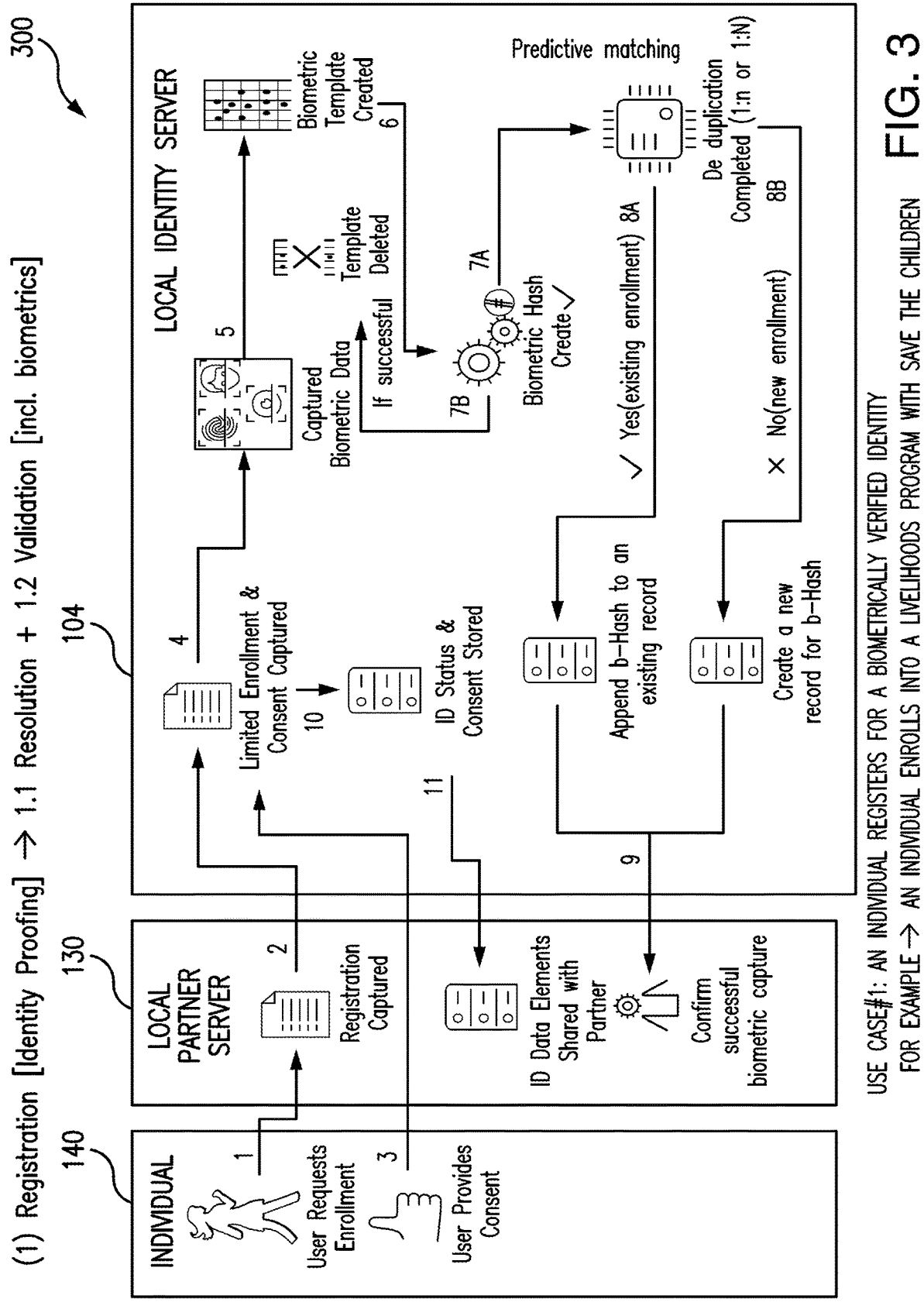
FIG. 3 illustrates a registration phase of the secure identity lifecycle with biometrics.

FIG. 3 illustrates a registration phase 300 of the secure identity lifecycle 200 with biometrics of FIG. 2. In the example of FIG. 3, the individual 140 requests enrollment in a program (e.g., a livelihoods program) or service offered by a partner via the local partner server 130. For example, the individual 140 may visit the partner to access the partner computer 135 and enroll.

The local partner server 130 captures the registration of the individual 140 and outputs the registration information to the local identity server 104. The individual 140 also indicates consent to the local partner server 130 and/or the local identity server 104.

As part of registering, the individual 140 provides biometric data associated with the individual 140. For example, the individual undergoes a facial scan, a fingerprint scan, an iris scan, or other suitable biometric scan. The biometric data associated with the individual 140 is included in the registration information that is output by the local partner server 130 to the local identity server 104.

The local identity server 104 captures the biometric data (including images) and generates a biometric template based on the biometric data. After generating the biometric template, the local identity server 104 generates a biometric hash and clears the biometric template, the biometric image, and any biometric data associated with the individual 140 from temporary memory. Although not shown in FIG. 2, if the biometric hash is unable to be generated from the biometric template, the local identity server 104 either clears the biometric template from temporary memory and attempts to generate another biometric template from the biometric data or clears both the biometric template and the biometric data from the temporary memory and requests additional biometric data from the individual 140.

After successfully generating the biometric hash, the local identity server 104 performs de-duplication using predictive matching to determine whether the biometric hash matches any existing biometric hash records stored in the database 114. Upon determining that the biometric hash matches an existing record, the local identity server 104 appends the generated biometric hash to the record and outputs a confirmation of a successful biometric capture to the individual 140 via the local partner server 130.

Additionally, the identification status of the individual 140, the consent of the individual 140 are stored in the database 114. The local identity server 104 also shares some of the identity elements with the partner.

Figure 4:
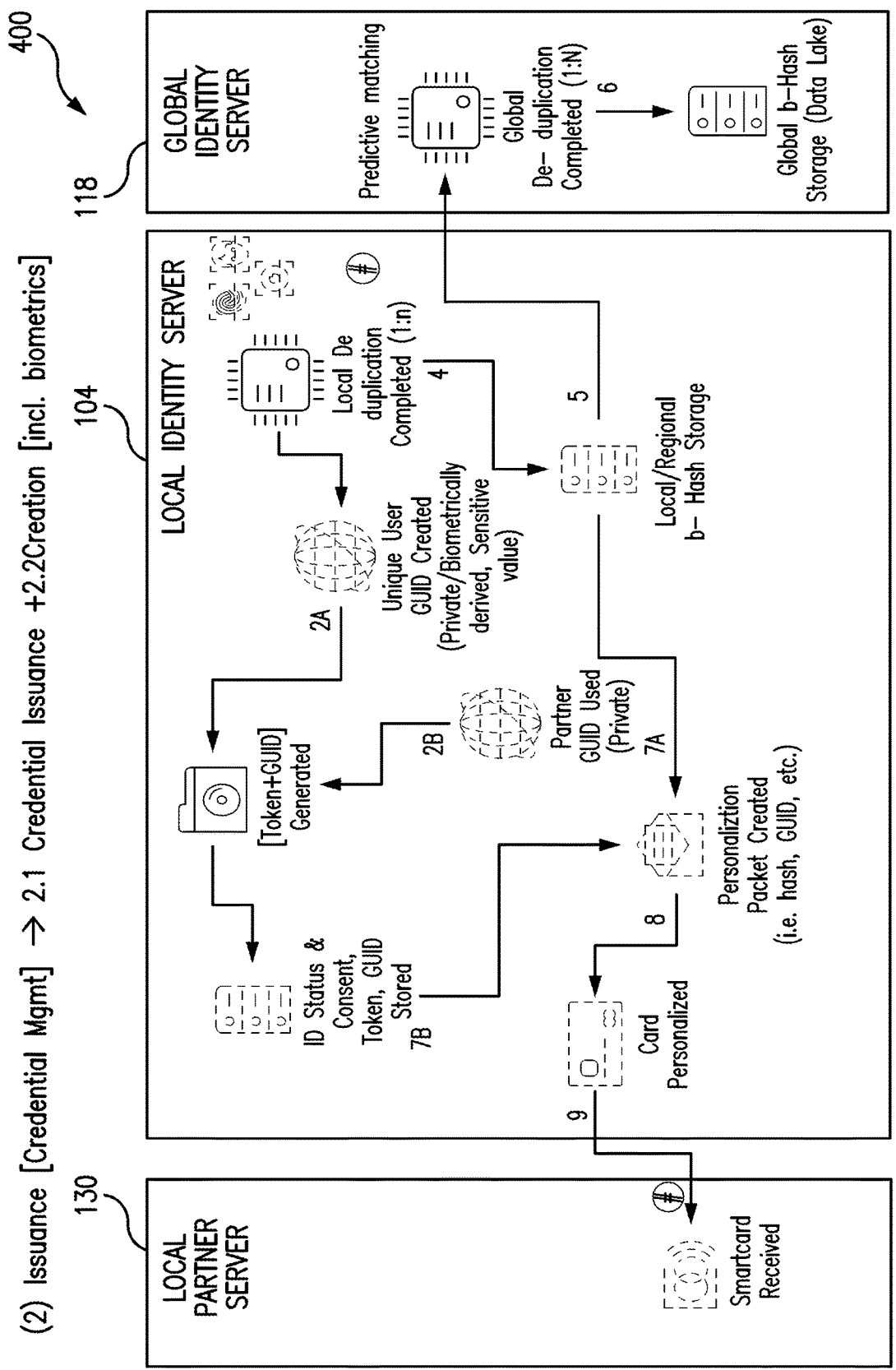
FIG. 4 illustrates an issuance phase of the secure identity lifecycle with biometrics.

FIG. 4 illustrates an issuance phase 400 of the secure identity lifecycle 200 with biometrics of FIG. 2. In the example of FIG. 4, after successfully generating the biometric hash, the local identity server 104 performs local de-duplication using predictive matching to determine whether the biometric hash matches any existing biometric hashes stored in the database 114. After checking against existing biometric hashes in the database 114, the local identity server 104 either generates a new global unique identifier (GUID) associated with the individual 140 and stores the GUID and the biometric hash in the database 114 or simply stores the biometric hash to an existing GUID associated with the individual 140.

After storing the biometric hash, the local identity server 104 generates a token based on the GUID of the individual 140 and the GUID of the partner associated with the local partner server 130. Upon generating the token, the local identity server 104 stores the identification status of the individual 140, the consent of the individual 140, the token associated with the individual 140, and the GUID associated with the individual 140 in the database 114.

After storing all of the information associated with the individual 140 in the database 114, the local identity server 104 may transmit the biometric hash to the global identity server 118 via the network 160. In other words, when "online," the local identity server 104 send biometric hashes to the global identity server 118.

After receiving the biometric hash from the local identity server 104, the global identity server 118 performs global de-duplication using predictive matching to determine whether the biometric hash matches any existing biometric hashes stored in the global database 126. After checking against existing biometric hashes in the global database 126, the global identity server 118 stores the biometric hash associated with the individual 140.

After storing all of the information associated with the individual 140 in the database 114, the local identity server 104 generates a personalization packet (e.g., the biometric has, the GUID, and/or the token) of the individual 140 and initiates the personalization of an identification asset (e.g., an near field communication (NFC) identification card) as well as the delivery of the identification asset to the partner.

Figure 5:
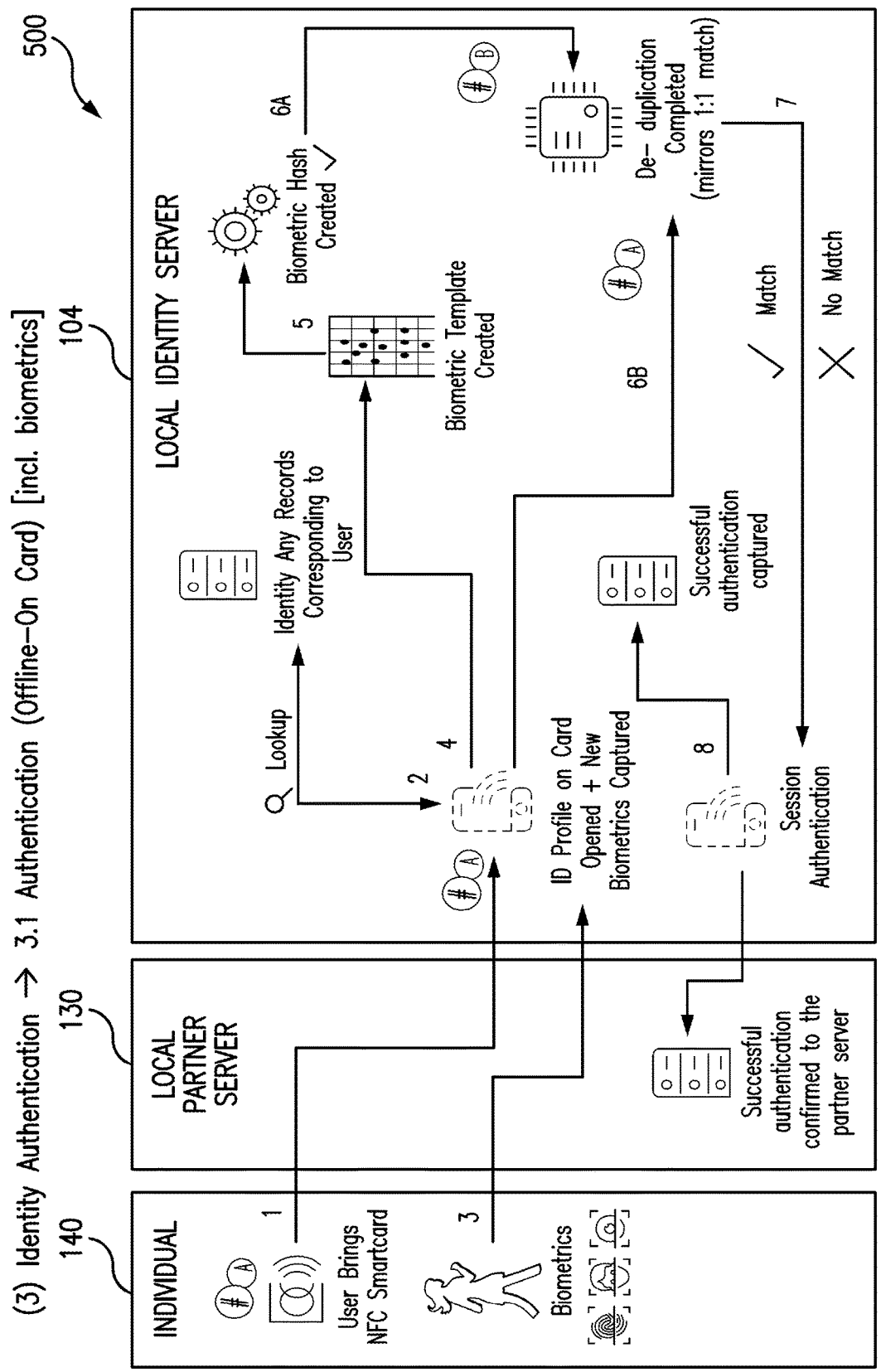
FIG. 5 illustrates an identity authentication phase of the secure identity lifecycle with biometrics.

FIG. 5 illustrates an identity authentication phase of the secure identity lifecycle with biometrics of FIG. 2. In the example of FIG. 5, the individual 140 uses the identification asset and ID profile that was created with the personalization packet described above in FIG. 4 at the partner's premise. The individual 140 also submits new biometric data using a previous biometric modality. The local partner server 130 passes the information of the individual 140 through to the local identity server 104.

After receiving the ID profile containing a first biometric hash and the new biometric data, the local identity server 104 looks up any records corresponding to the individual 140. The local identity server 104 also generates a biometric template from the new biometric data and generates a second biometric hash from the biometric template. The local identity server 104 authenticates the identity of the individual 140 by performing de-duplication between the first biometric hash and the second biometric hash.

If a match between the first biometric hash and the second biometric hash is at or above a threshold level (e.g., 90% similarity), the hashes are considered to match. If a match between the first biometric hash and the second biometric hash is below a threshold level (e.g., 90% similarity), the hashes are considered to not match. The threshold is not a static level, but rather a dynamic level. For example, the age of the individual 140 may be considered when applying the threshold level to compensate for any growth that has occurred since the first biometric hash was generated.

After determining there is a match between the first biometric hash and the second biometric hash, the local identity server 104 authenticates the session with the individual 140. The local server 104 also stores the successful authentication in the record 116 associated with the individual 140 and outputs the successful authentication to the local partner server 130. The local partner server 130 may store the successful authentication in its own database.

Figure 6:
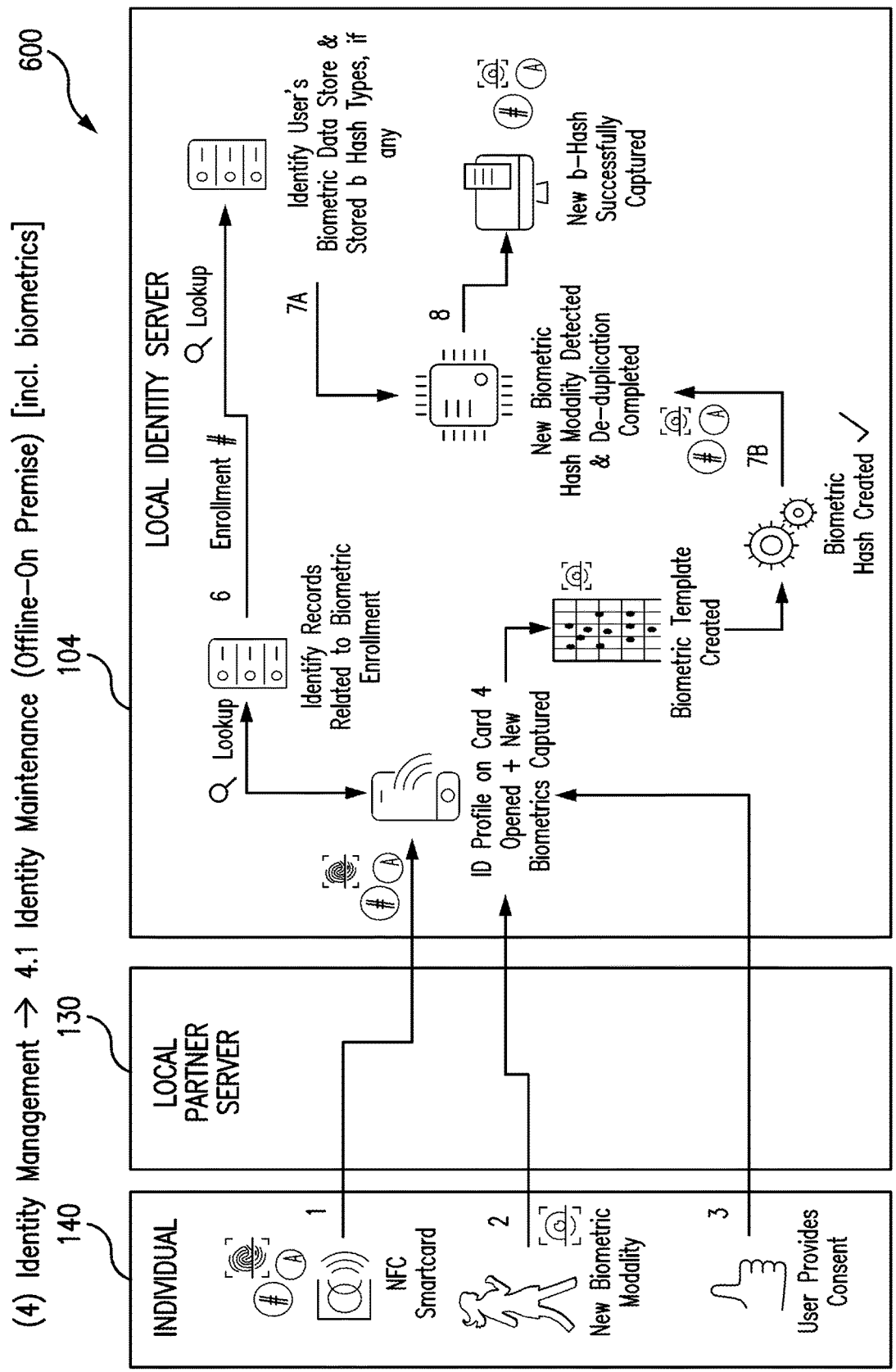
FIG. 6 illustrates a first identity management phase of the secure identity lifecycle with biometrics.

FIG. 6 illustrates a first identity management phase 600 of the secure identity lifecycle with biometrics of FIG. 2. In the example of FIG. 6, the individual 140 uses the identification asset and ID profile that was created with the personalization packet described above in FIG. 4 at the partner. The individual 140 submits new biometric data using a new biometric modality (e.g., an iris scan) as well as providing new consent to the new biometric data.

The local identity server 104 generates a biometric template from the new biometric data and generates a second biometric hash (e.g., an iris-based hash) from the biometric template. Additionally, after receiving the ID profile containing a first biometric hash (e.g., a fingerprints-based hash) and the new biometric data, the local identity server 104 looks up any records corresponding to the individual 140. For example, the local identity server 104 looks up whether the individual 140 has any existing biometric hashes. Upon determining there are existing biometric hashes, the local identity server 104 determines the types of the existing biometric hashes. The local identity server 104 maintains the identity of the individual 140 by performing de-duplication between the first biometric hash and the second biometric hash to detect the new biometric hash modality.

Figure 7:
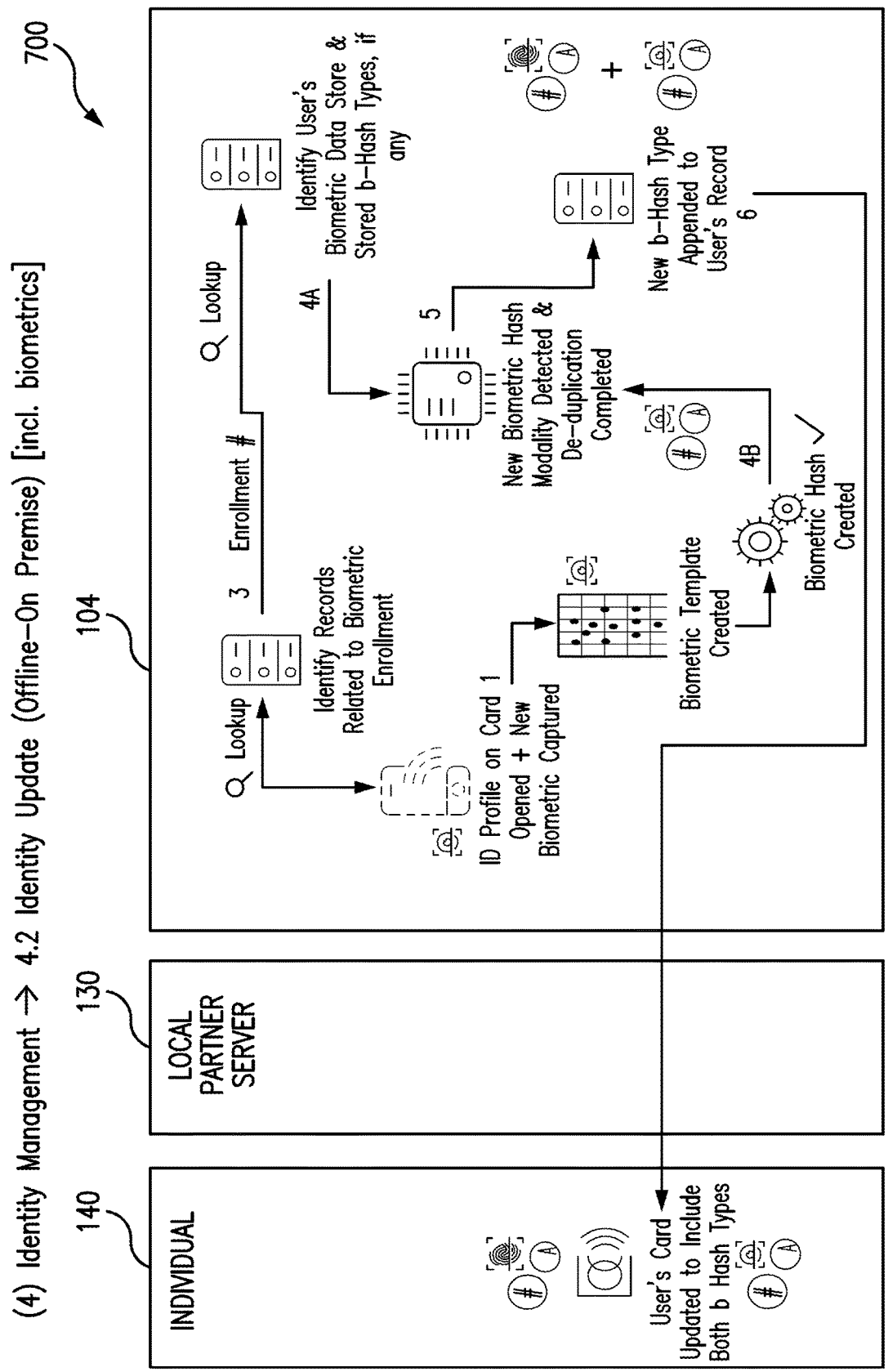
FIG. 7 illustrates a second identity management phase of the secure identity lifecycle with biometrics.

FIG. 7 illustrates a second identity management phase 700 of the secure identity lifecycle with biometrics of FIG. 2. In the example of FIG. 7, the local identity server 104 receives information regarding the use of the identification asset and ID profile that was created with the personalization packet described above in FIG. 4 at the partner. The local identity server 104 also receives new biometric data using a new biometric modality (e.g., an iris scan).

The local identity server 104 generates a biometric template from the new biometric data and generates a second biometric hash (e.g., an iris-based hash) from the biometric template. Additionally, after receiving the ID profile containing a first biometric hash (e.g., a fingerprints-based hash) and the new biometric data, the local identity server 104 looks up any records corresponding to the individual 140. For example, the local identity server 104 looks up whether the individual 140 has any existing biometric hashes (e.g., biometric hashes associated with other partners). Upon determining there are existing biometric hashes, the local identity server 104 determines the types of the existing biometric hashes. The local identity server 104 maintains the identity of the individual 140 by performing de-duplication between the first biometric hash and the second biometric hash to detect the new biometric hash modality. After detecting there is a new biometric hash modality, the local identity server 104 stores the second biometric hash in the record 116 associated with the individual 140 and updates the identification asset to include the second biometric hash.

Figure 8:
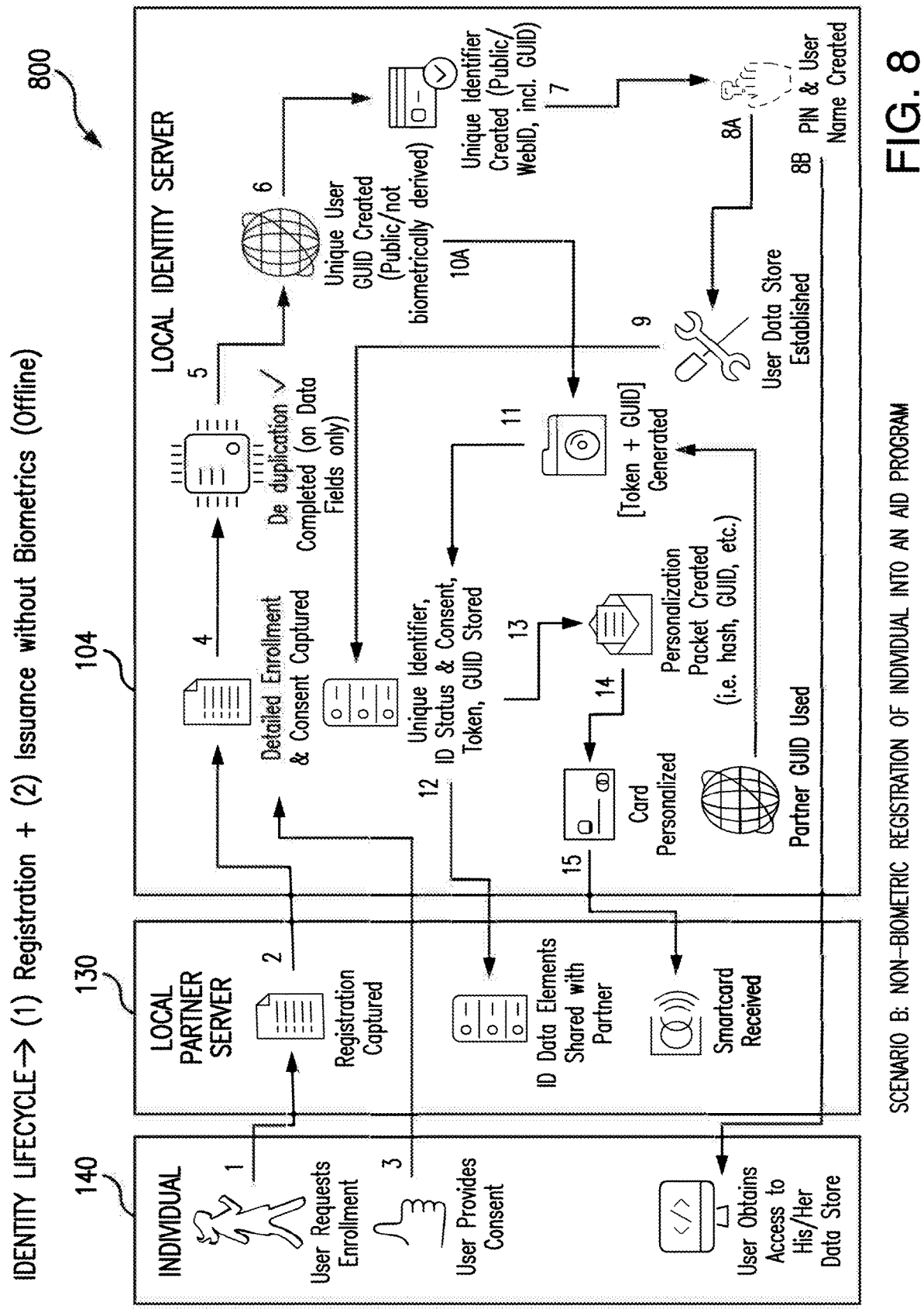
FIG. 8 illustrates a secure identity lifecycle without biometrics.

FIG. 8 illustrates a secure identity lifecycle 800 without biometrics. In the example of FIG. 8, the individual 140 requests enrollment in a program or service offered by a partner via the local partner server 130. For example, the individual 140 may visit the partner to access the partner computer 135 and enroll.

The local partner server 130 captures the registration of the individual 140 and outputs the registration information to the local identity server 104. The individual 140 also indicates consent to the local partner server 130 and/or the local identity server 104.

As part of registering, the individual 140 provides detailed information associated with the individual 140. The detailed information associated with the individual 140 is included in the registration information that is output by the local partner server 130 to the local identity server 104.

The local identity server 104 performs de-duplication on data fields and generates an individual global unique identifier (GUID) associated with the individual 140. The local identity server 104 also generates a unique identifier (e.g., a web ID including the public individual GUID) that is public. After generating the unique identifier, the local identity server 104 generates a personal identification number (PIN) and username and establishes a user data store associated with the individual 140 in the database 114.

After establishing the user data store, the local identity server 104 generates a token based on the GUID of the individual 140 and the GUID of the partner associated with the local partner server 130. Upon generating the token, the local identity server 104 stores the unique identifier of the individual 140, the identification status of the individual 140, the consent of the individual 140, the token associated with the individual 140, and the GUID associated with the individual 140 in the database 114. The local identity server 104 also shares some of the identity elements with the local partner server 130.

After storing all of the information associated with the individual 140 in the database 114, the local identity server 104 generates a personalization packet (e.g., the biometric hash, the GUID, and/or the token) of the individual 140 and initiates the personalization of an identification asset (e.g., an near field communication (NFC) identification card) as well as the delivery of the identification asset to the partner. The above-described enrollment between the individual 140, the local partner server 130, and the local identity server 104 is an offline enrollment.

Figure 9:
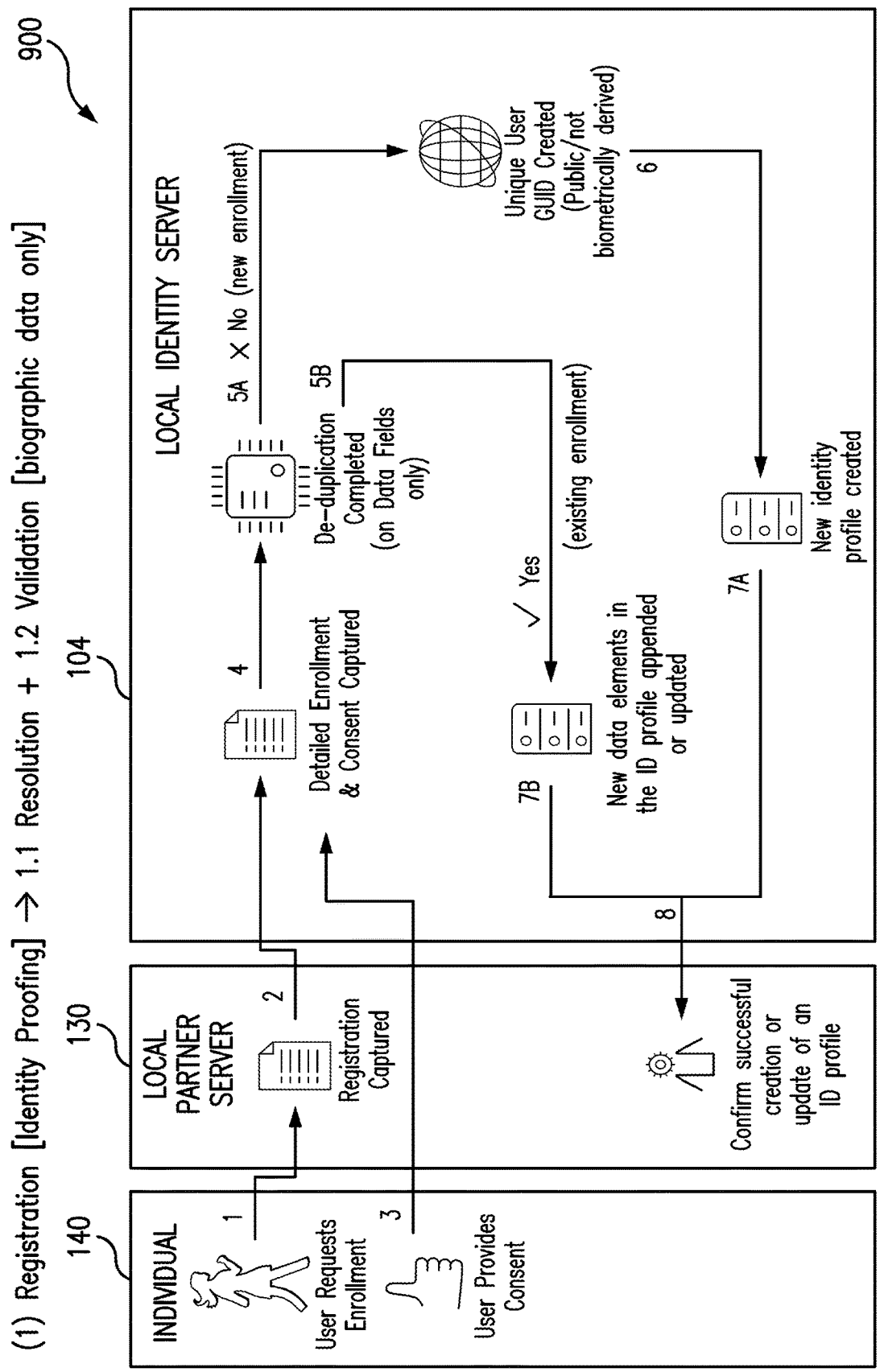
FIG. 9 illustrates a registration phase of the secure identity lifecycle without biometrics.

FIG. 9 illustrates a registration phase 900 of the secure identity lifecycle 800 without biometrics. In the example of FIG. 9, the individual 140 requests enrollment in a program or service offered by a partner via the local partner server 130. For example, the individual 140 may visit the partner to access the partner computer 135 and enroll.

The local partner server 130 captures the registration of the individual 140 and outputs the registration information to the local identity server 104. The individual 140 also indicates consent to the local partner server 130 and/or the local identity server 104.

As part of registering, the individual 140 provides detailed information associated with the individual 140. The detailed information associated with the individual 140 is included in the registration information that is output by the local partner server 130 to the local identity server 104.

The local identity server 104 performs de-duplication on data fields to determine whether the individual is already enrolled. Upon determining that the individual is not enrolled, the local identity server 104 generates a user global unique identifier (GUID) associated with the individual 140. The local identity server 104 also generates a unique identity profile (e.g., a web ID) that is public. After generating the unique identity profile, the local identity server 104 confirms the successful creation of the ID profile. Upon determining that the individual is enrolled, the local identity server 104 updates or appends data elements in an existing ID profile that is associated with the individual 140. After updating the ID profile, the local identity server 104 confirms the successful update of the ID profile.

Figure 10:
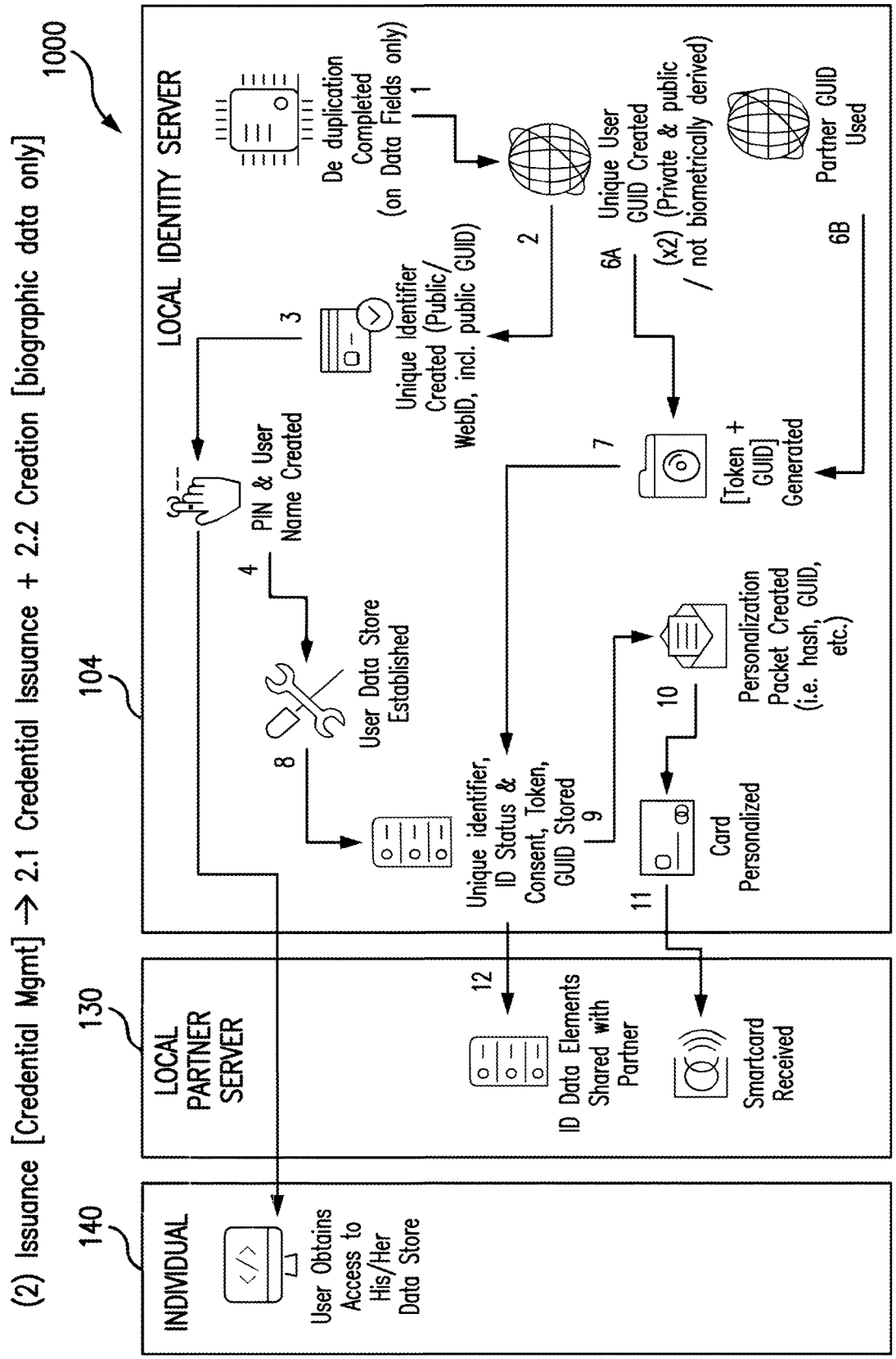
FIG. 10 illustrates an issuance phase of the secure identity lifecycle without biometrics.

FIG. 10 illustrates an issuance phase 1000 of the secure identity lifecycle 800 without biometrics. In the example of FIG. 10, the local identity server 104 performs de-duplication on data fields and generates two user global unique identifier (GUID) associated with the individual 140. One of the two individual GUIDs is public and the other of the two individual GUIDs is private.

The local identity server 104 also generates a unique identifier (e.g., a Web ID, including the public individual GUID) that is public. After generating the unique identifier, the local identity server 104 generates a personal identification number (PIN) and username and establishes a user data store associated with the individual 140 in the database 114.

After establishing the user data store, the local identity server 104 generates a token based on the private GUID of the individual 140 and the GUID of the partner associated with the local partner server 130. Upon generating the token, the local identity server 104 stores the unique identifier of the individual 140, the identification status of the individual 140, the consent of the individual 140, the token associated with the individual 140, and the private GUID associated with the individual 140 in the database 114. The local identity server 104 also shares some of the identity elements with the local partner server 130.

After storing all of the information associated with the individual 140 in the database 114, the local identity server 104 generates a personalization packet (e.g., the unique identifier, the GUID, and/or the token) of the individual 140 and initiates the personalization of an identification asset (e.g., an near field communication (NFC) identification card) as well as the delivery of the identification asset to the partner.

Figure 11:
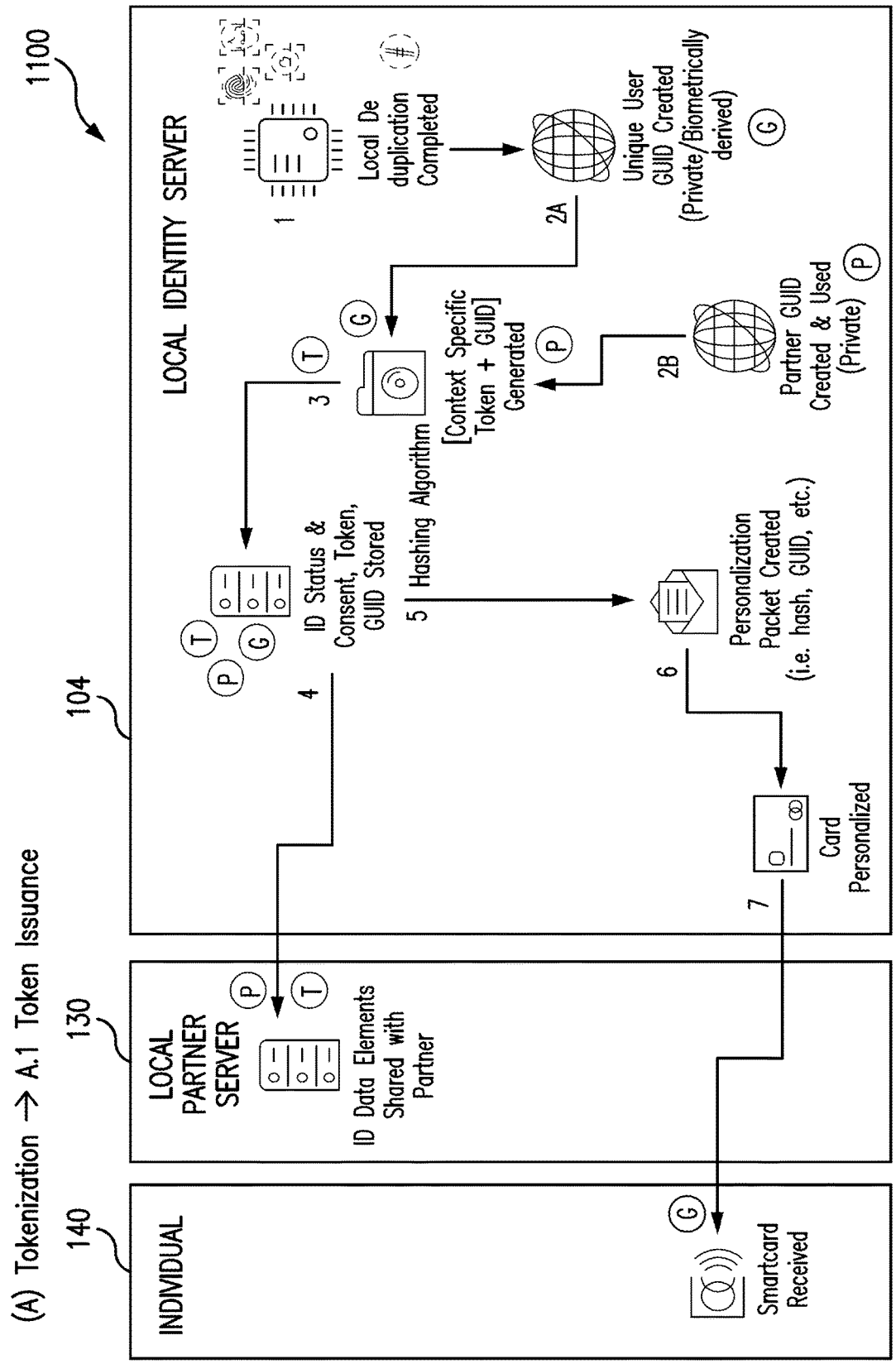
FIG. 11 illustrates a token issuance process of the example system of FIG. 1.

FIG. 11 illustrates a token issuance process 1100 of the example system of FIG. 1. In the example of FIG. 11, the local identity server 104 performs local de-duplication of information from the individual 140 and generates a global unique identifier (GUID) or "G" that is private (i.e., based on detailed information provided by the individual 140) or biometrically derived (i.e., based on biometric data provided by the individual 140).

The local identity server 104 generates a token "T" by combining the GUID "G" with the partner global unique identifier "P" that is private. The local identity server 104 stores the identification status, the token "T", the GUID "G", and the partner GUID "P" in the database 114. The local identity server 104 may also share some of the ID data elements with the local partner server 130 (e.g., the partner GUID "P" and the token "T").

After storing all of the information associated with the individual 140 in the database 114, the local identity server 104 generates a personalization packet (e.g., the GUID and/or the token) of the individual 140 and initiates the personalization of an identification asset (e.g., an near field communication (NFC) identification card) as well as the delivery of the identification asset to the partner and/or the individual.

Figure 12:
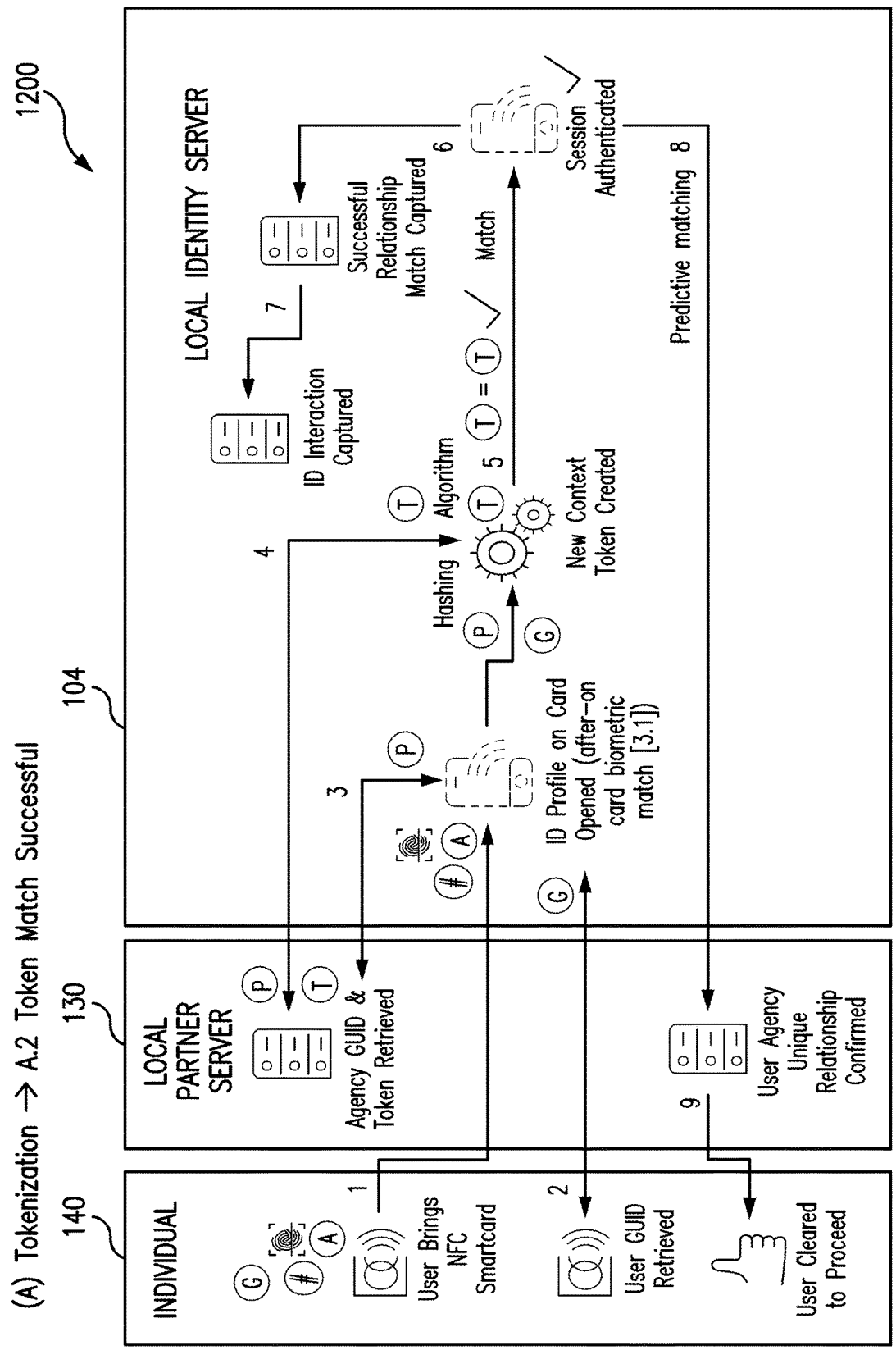
FIG. 12 illustrates a successful token matching process of the example system of FIG. 1.

FIG. 12 illustrates a successful token matching process 1200 of the example system of FIG. 1. In the example of FIG. 12, the individual 140 brings the identification asset (e.g., the NFC smartcard) to the partner and the partner computer. The local identity server 104 confirms an authentication of the biometric hash on the card based an on-card biometric match (e.g., the authentication phase 500 of FIG. 5).

After confirming an on-card biometric match, the local identity server 104 retrieves the ID profile and the biometric hash stored on the identification asset via the local partner server 130 and the partner computer 135. Specifically, the local identity server 104 retrieves the individual GUID stored on the identification asset.

Additionally, after confirming the on-card biometric match, the local identity server 104 retrieves the token associated with the individual 140 and the partner GUID from the local partner server 130. The local identity server 104 uses the individual GUID "G" and the partner GUID "P" to generate a new context token. The local identity server 104 then uses a matching technique to compare the new content token to the token retrieved from the local partner server 130.

Upon determining the new context token matches the token retrieved from the local partner server 130, the local identity server 104 captures the successful relationship match and captures the identification asset interaction. The local identity server 104 also authenticates the session and outputs confirmation of the authenticated session to the local partner sever 130. Upon receiving confirmation, the local partner server 130 clears the individual 140 to proceed.

Figure 13:
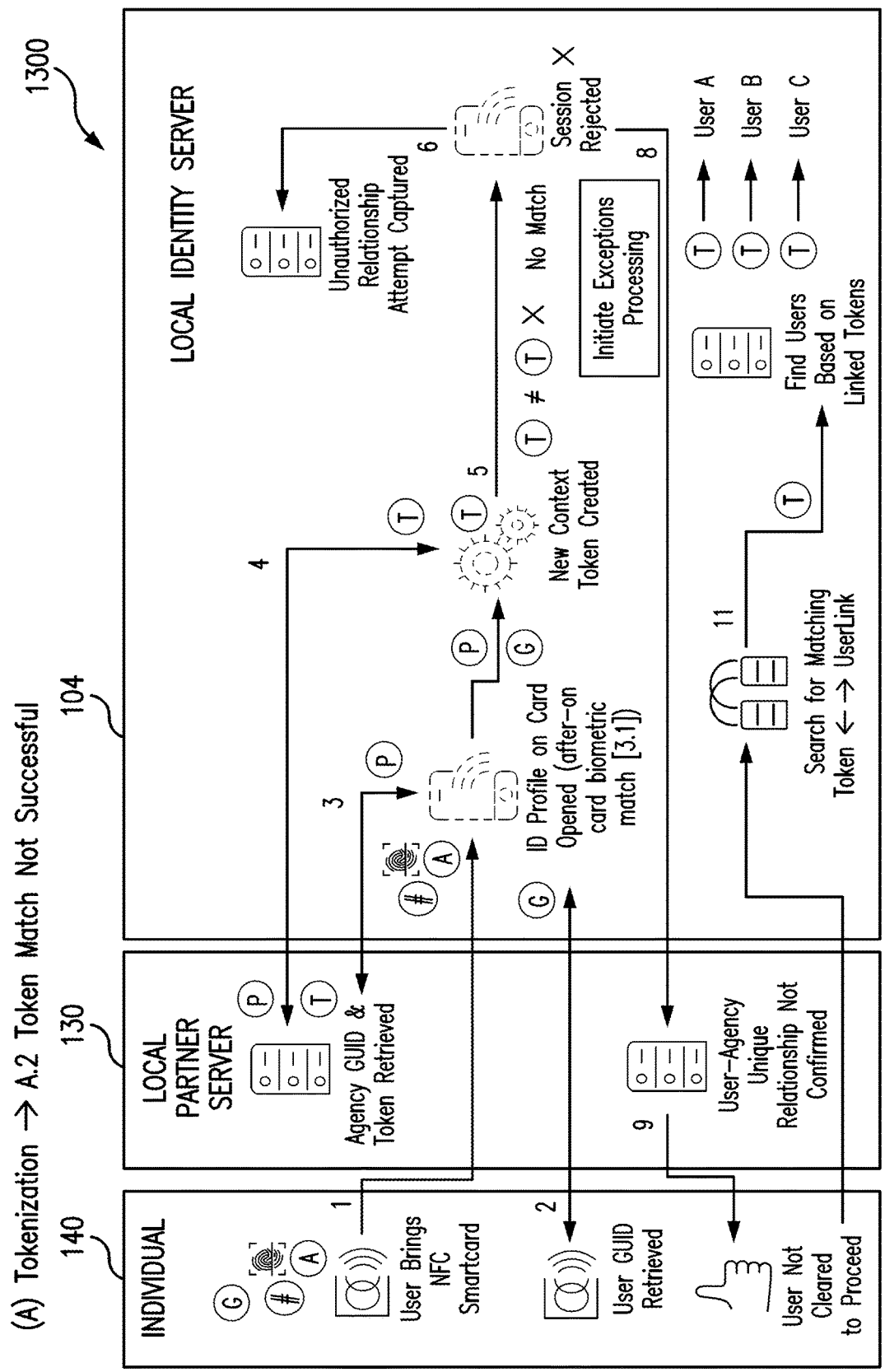
FIG. 13 illustrates an unsuccessful token matching process of the example system of FIG. 1.

FIG. 13 illustrates an unsuccessful token matching process 1300 of the example system of FIG. 1. In the example of FIG. 13, the individual 140 brings the identification asset (e.g., the NFC smartcard) to the partner and the partner computer. The local identity server 104 confirms an authentication of the biometric hash on the card based an on-card biometric match (e.g., the authentication phase 500 of FIG. 5).

After confirming an on-card biometric match, the local identity server 104 retrieves the ID profile and the biometric hash stored on the identification asset via the local partner server 130 and the partner computer 135. Specifically, the local identity server 104 retrieves the individual GUID stored on the identification asset.

Additionally, after confirming the on-card biometric match, the local identity server 104 retrieves the token associated with the individual 140 and the partner GUID from the local partner server 130. The local identity server 104 uses the individual GUID "G" and the partner GUID "P" to generate a new context token. The local identity server 104 then uses predictive matching to compare the new content token to the token retrieved from the local partner server 130.

Upon determining the new context token does not match the token retrieved from the local partner server 130, the local identity server 104 captures the unsuccessful relationship match and the unauthorized relationship attempt (whether friendly or unfriendly). The local identity server 104 also rejects the session and outputs an indication that the user-partner unique relation is not confirmed to the local partner sever 130. Upon receiving the indication, the local partner server 130 does not clear the individual 140 to proceed. A number of possible exceptions processing actions may be designed and initiated at that stage to guide a response to this event. For example, the exceptions processing actions may include one or more of rejecting the authentication attempt, creating a record of a potential fraud attempt, sending the unmatched token to the global data store for "matching" and flagging profile of individual associated with the unmatched token, performing an alternate method of authentication, or other suitable exceptions processing action.

As illustrated in FIG. 13, in some examples, the local identity server 104 searches the database 114 to find a token that matches the new context token. Upon determining a match between a token in the database 114 and the new context token, the local identity server 104 determines an individual that is linked to the new context token and flags that relationship for possible review.

Thus, as has been described, the system 100 may, among other things, allow the individual 140 to be securely identified without compromising the PII of the individual 140.

Figure 14:
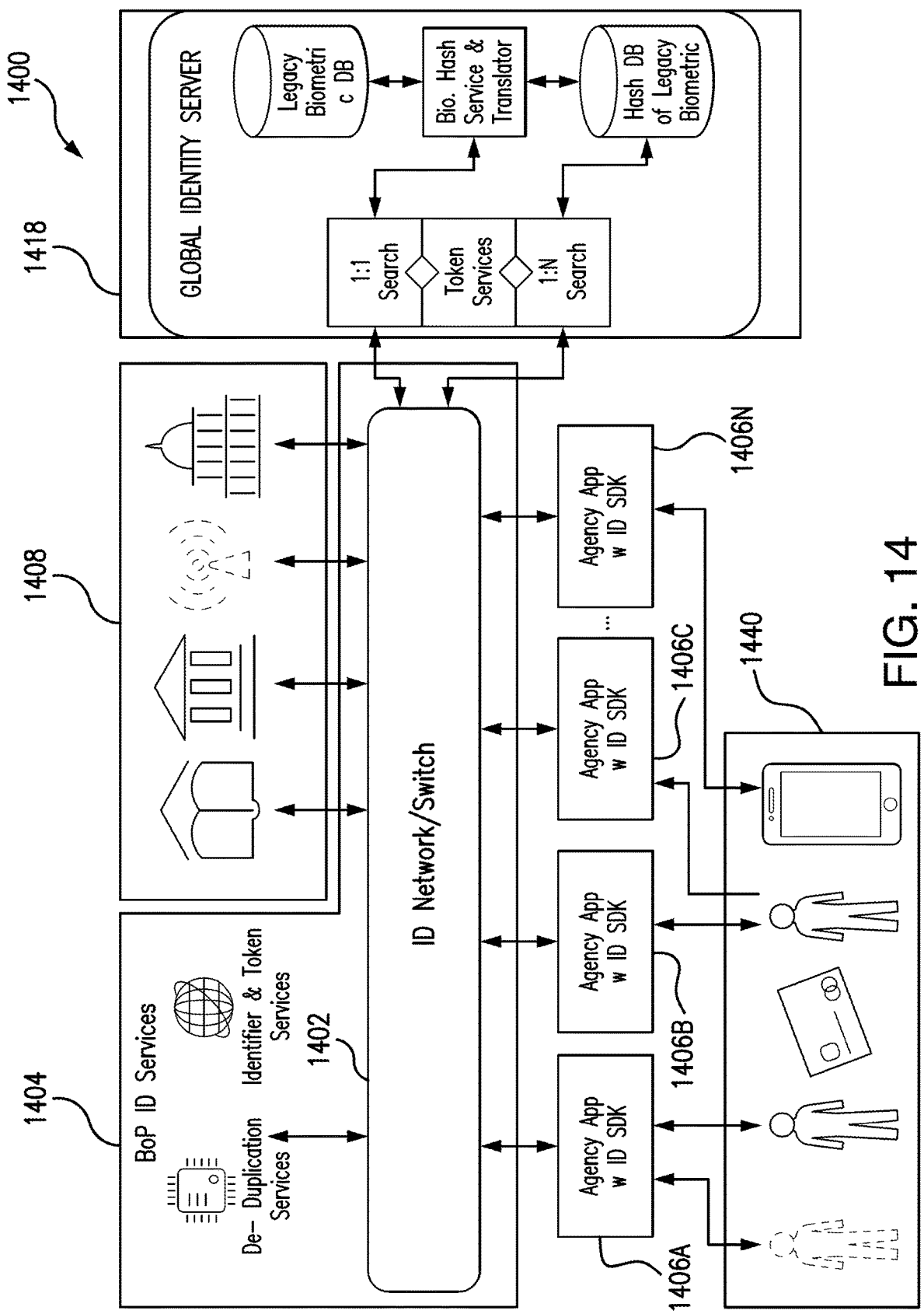
FIG. 14 illustrates a second example system for securely identifying an individual.

FIG. 14 illustrates a second example system 1400 for securely identifying an individual. In the example of FIG. 14, the system 1400 includes an identity (ID) network/switch 1402 as part of a local identity server 1404, a plurality of local partner servers 1406A-1406N, legacy servers 1408, a global identity server 1418, and an individual 1440.

In the example of FIG. 14, the identity (ID) network/switch 1402 interconnects the biometric services of the local identity server 1404, the legacy servers 1408, and the global identity server 1418. In some examples, the local identity server 1404 is the same or similar to the local identity server 104; each local partner server of the plurality of local partner servers 1406A-1406N is the same or similar to the local partner server 130; and the global identity server 1418 is the same or similar to the global identity server 118, respectively, as described above in FIGS. 1-13. Consequently, the redundant description of the local identity server 1404, the plurality of local partner servers 1406A-1406N, and the global identity server 1418 is not repeated herein.

As illustrated in FIG. 14, each of the plurality of local partner servers 1406A-1406N includes an agency application with an identity software development kit (ID SDK). The ID SDK is a program that differentiates between standardized biometric templates associated with the local identity server 1404 and/or the global identity server 1418, and proprietary biometric templates associated with one or more of the legacy servers 1408. For example, when the individual 1440 requests a service from the local partner server 1406A and provides a standardized biometric template from an individual resource (e.g., an identification vehicle), the local partner server 1406A routes the standardized biometric template to the global identity server 1418 via the local identity server 1404.

However, when the individual 1440 requests a service from the local partner server 1406A and provides a proprietary biometric template from the individual resource, the local partner server 1406A routes the proprietary biometric template to one or more of the legacy servers 1408 via the local identity server 1404. Additionally, in some examples, when the individual 1440 requests a service from the local partner server 1406A and provides a proprietary biometric template from the individual resource, the local partner server 1406A may also route the proprietary biometric template to one or more of the legacy servers 1408 and the global identity server 1418 via the local identity server 1404. In other words, the identity network/switch 1402 is a network that interconnects various databases to receive identity information from the individual 1440 and one or more databases are targeted based on the type of identity information that is received from the individual 1440.

In the example of FIG. 14, the identity information from the individual 1440 may be provided to the global identity server 1418, one or more of the legacy servers 1408, or both without exposing any personally identifiable information (PII). Consequently, the ID network/switch 1402 allows the legacy servers 1408 to interoperate with the local identity server 1404, the global identity server 1418, and the plurality of local partner servers 1406A-1406N without needing to expose any PII that may exist in the legacy servers 1408. In some examples, the legacy servers 1408 may include existing government databases (e.g., a national identity database), financial databases, telecommunication databases, or other suitable legacy databases that include personally identifiable information (PII).

Additionally, as illustrated in FIG. 14, the global identity server 1418 includes a biometric hash translation service. However, in other examples, the local identity server 1404 may include the biometric hash translation service. The biometric hash translation service translates the propriety biometric template from either the individual 1440 via the ID network/switch 1402 or the legacy servers 1408 to a biometric hash. The biometric hash may then be stored in the database 126 of the global identity server 1418. Similarly, the biometric hash may also be stored in the database 114 of the local identity server 1404. In other words, the biometric hash translation service in combination with the ID network/switch 1402 increases the number of biometric hashes that are associated with the individual 1440 by converting the proprietary biometric templates that are sent to and associated with the legacy servers 1408 to biometric hashes. The biometric hashes that are converted from the proprietary biometric templates may then be stored locally and/or globally.

Figure 15:
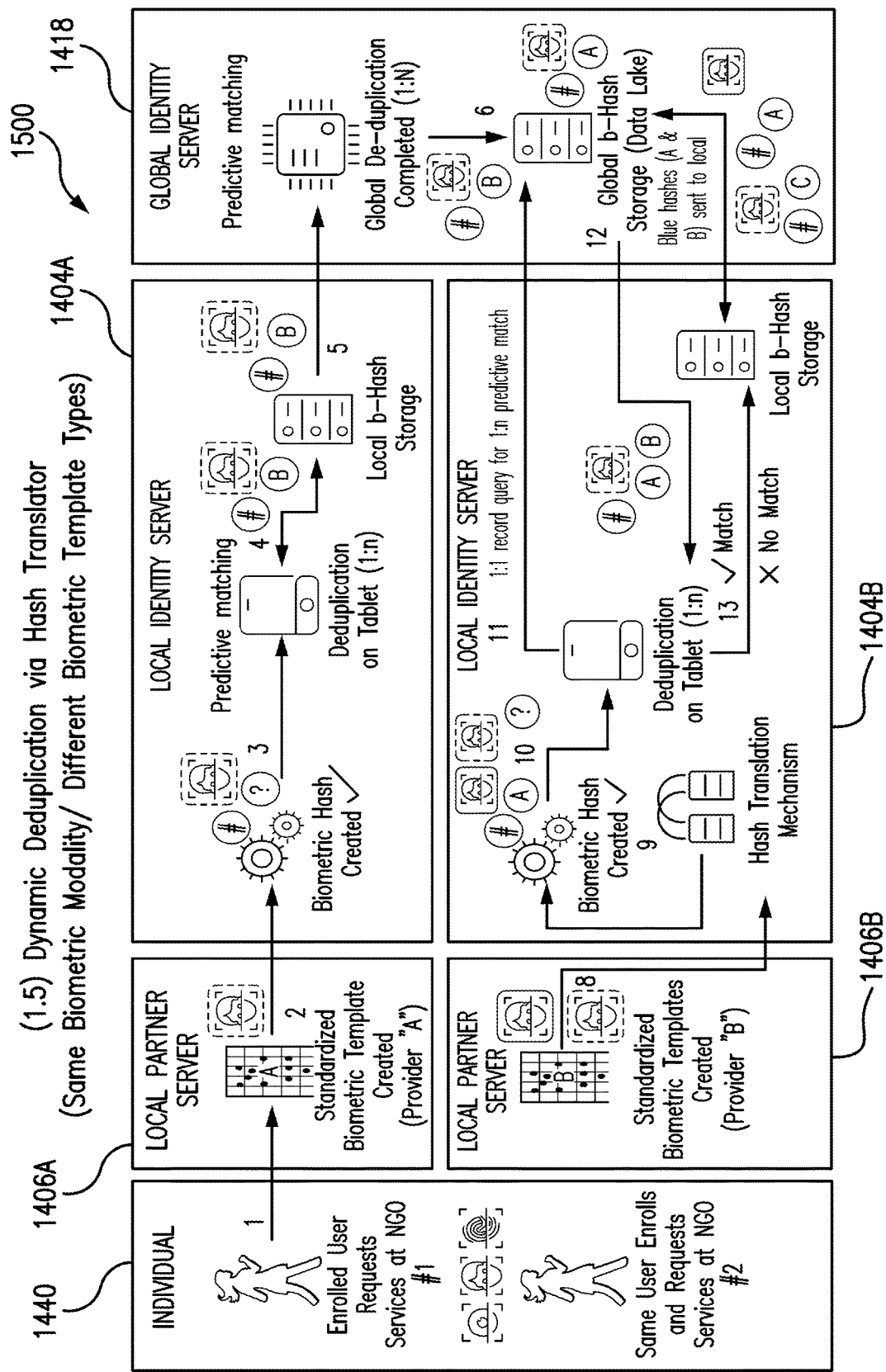
FIG. 15 illustrates one example implementation of the identity network/switch of FIG. 14.

FIG. 15 illustrates one example implementation of the identity network/switch 1402 of FIG. 14. In the example of FIG. 15, the individual 1440 requests enrollment in a program or service offered by a partner via the local partner server 1406A. For example, the individual 1440 may visit the partner to access the partner computer 135A and enroll.

The local partner server 1406A captures the registration of the individual 1440 from the partner computer 135A and outputs the registration information to the local identity server 1404A. The individual 1440 also indicates consent to the local partner server 1406A and/or the local identity server 1404A.

As part of registering, the individual 1440 provides biometric data associated with the individual 1440. For example, the individual undergoes a facial scan, a fingerprint scan, an iris scan, or other suitable biometric scan. The biometric data associated with the individual 1440 is transformed by the local partner server 1406A into a standardized biometric template, which is then associated with the local partner server 1406A. The standardized biometric template and the registration information is output by the local partner server 1406A to the local identity server 1404A.

The local identity server 1404A captures the standardized biometric template and the registration information. The local identity server 1404A generates a biometric hash based on the standardized biometric template and clears both the standardized biometric template and any biometric data associated with the individual 1440 from temporary memory. For example, the local identity server 1404A may use the Trust Stamp™ technology to generate the biometric hash from the standardized biometric template created by the local partner server 1406A.

Although not shown in FIG. 15, if the biometric hash is unable to be generated from the standardized biometric template, the local identity server 1404A clears the standardized biometric template from temporary memory and requests another standardized biometric template from the individual 1440 via the local partner server 1406A.

After successfully generating the biometric hash, the local identity server 1404A performs de-duplication using predictive matching to determine whether the biometric hash matches any existing biometric hashes stored in the database 114. For example, the local identity server 1404A may use the Trust Stamp™ technology to perform predictive matching to determine whether the biometric hash matches any existing biometric hashes stored in the database 114. After checking against existing biometric hashes in the database 114, the local identity server 1404A either generates a new global unique identifier (GUID) associated with the individual 1440 and stores the GUID and the biometric hash in the database 114 or simply stores the biometric hash to an existing GUID associated with the individual 1440.

After storing all of the information associated with the individual 1440 in the database 114, the local identity server 1404A may transmit the biometric hash to the global identity server 1418 via the network 160. In other words, when "online," the local identity server 1404A sends biometric hashes to the global identity server 1418.

After receiving the biometric hash from the local identity server 1404A, the global identity server 1418 performs global de-duplication using predictive matching to determine whether the biometric hash matches any existing biometric hashes stored in the global database 126. After checking against existing biometric hashes in the global database 126, the global identity server 1418 stores the biometric hash associated with the individual 1440.

Additionally, in the example of FIG. 15, the individual 1440 requests enrollment in a program or service offered by a second partner via the local partner server 1406B. For example, the individual 1440 may visit the second partner to access the partner computer 135B and enroll.

The local partner server 1406B captures the registration of the individual 1440 and outputs the registration information to the local identity server 1404B. The individual 1440 also indicates consent to the local partner server 1406B and/or the local identity server 1404B.

As part of registering, the individual 1440 provides biometric data associated with the individual 1440. For example, the individual 1440 undergoes a facial scan, a fingerprint scan, an iris scan, or other suitable biometric scan. Additionally, in some examples, the individual 1440 may provide an existing standardized biometric template to the local partner server 1406B. The biometric data associated with the individual 1440 is transformed into a standardized biometric template that is associated with the local partner server 1406B. The standardized biometric template, the registration information, and the existing standardized biometric template are output by the local partner server 1406B to the local identity server 1404B.

The local identity server 1404B captures the standardized biometric template, the registration information, and the existing standardized biometric template. The local identity server 1404B performs a hash translation between the standardized biometric template and the existing standardized biometric template and generates a biometric hash based on the hash translation and clears the standardized biometric template, the existing standardized biometric template, and any biometric data associated with the individual 1440 from the temporary memory. For example, the local identity server 1404B may use the Trust Stamp™ technology to generate the biometric hash from the standardized biometric template created by the local partner server 1406B and the existing standardized template created by the local partner server 1406A.

Although not shown in FIG. 15, if the biometric hash is unable to be generated from the hash translation, the local identity server 1404B may clear the standardized biometric template from temporary memory and request another standardized biometric template from the individual 1440 via the local partner server 1406B.

After successfully generating the biometric hash, the local identity server 1404B performs a record query (i.e., a 1:1 record query for 1:n predictive match) of the individual because the biometric hash is based at least in part on an existing standardized biometric template. The global identity server 1418 outputs any similar biometric hashes to the local identity server 1404B.

The local identity server 1404B performs de-duplication using predictive matching to determine whether the biometric hash matches any existing biometric hashes stored in the database 114 and the biometric hashes received from the global identity server 1418. For example, the local identity server 1404B may use the Trust Stamp™ technology to perform predictive matching to determine whether the biometric hash matches any existing biometric hashes stored in the database 114 and the biometric hashes received from the global identity server 1418.

In one example, after checking against existing biometric hashes in the database 114 and the biometric hashes received from the global identity server 1418, the local identity server 1404B finds no match and generates a new global unique identifier (GUID) associated with the individual 1440 and stores the GUID and the biometric hash in the database 114.

In another example, after checking against existing biometric hashes in the database 114 and the biometric hashes received from the global identity server 1418, the local identity server 1404B finds a match and stores the biometric hash, the existing hashes, and an existing GUID associated with the individual 1440 in the database 114.

After storing all of the information associated with the individual 1440 in the database 114, the local identity server 1404B may transmit the biometric hash to the global identity server 1418 via the network 160. In other words, when "online," the local identity server 1404B sends "matched" biometric hashes to the global identity server 1418.

After receiving the biometric hash from the local identity server 1404B, the global identity server 1418 may simply store the biometric hash associated with the individual 1440. In other examples, after receiving the biometric hash from the local identity server 1404B, the global identity server 1418 may perform a global de-duplication using predictive matching to determine whether the biometric hash matches any existing biometric hashes stored in the global database 126. After performing the global de-duplication, the global identity server 1418 stores the biometric hash associated with the individual 1440.

In the example of FIG. 15, the identity network/switch 1402 of FIG. 14 is the interconnection between the local partner servers 1406A and 1406B, the local identity servers 1404A and 1404B, and the global identity server 1418. With the above-noted interconnection, the local identity servers 1404A and 1404B continuously update their respective database 114 when the individual 1440 requests a service. Likewise, the global identity server 1418 continuously updates the database 126 when the individual 1440 requests a service. These continuous updates of biometric hashes ensure that the local identity servers 1404A and 1404B and the global identity server 1418 may accurately identify the individual 1440 even as the biometric data of the individual 1440 changes over time. For example, these continuous updates may account for the aging of the individual 1440 over time.

Figure 16:
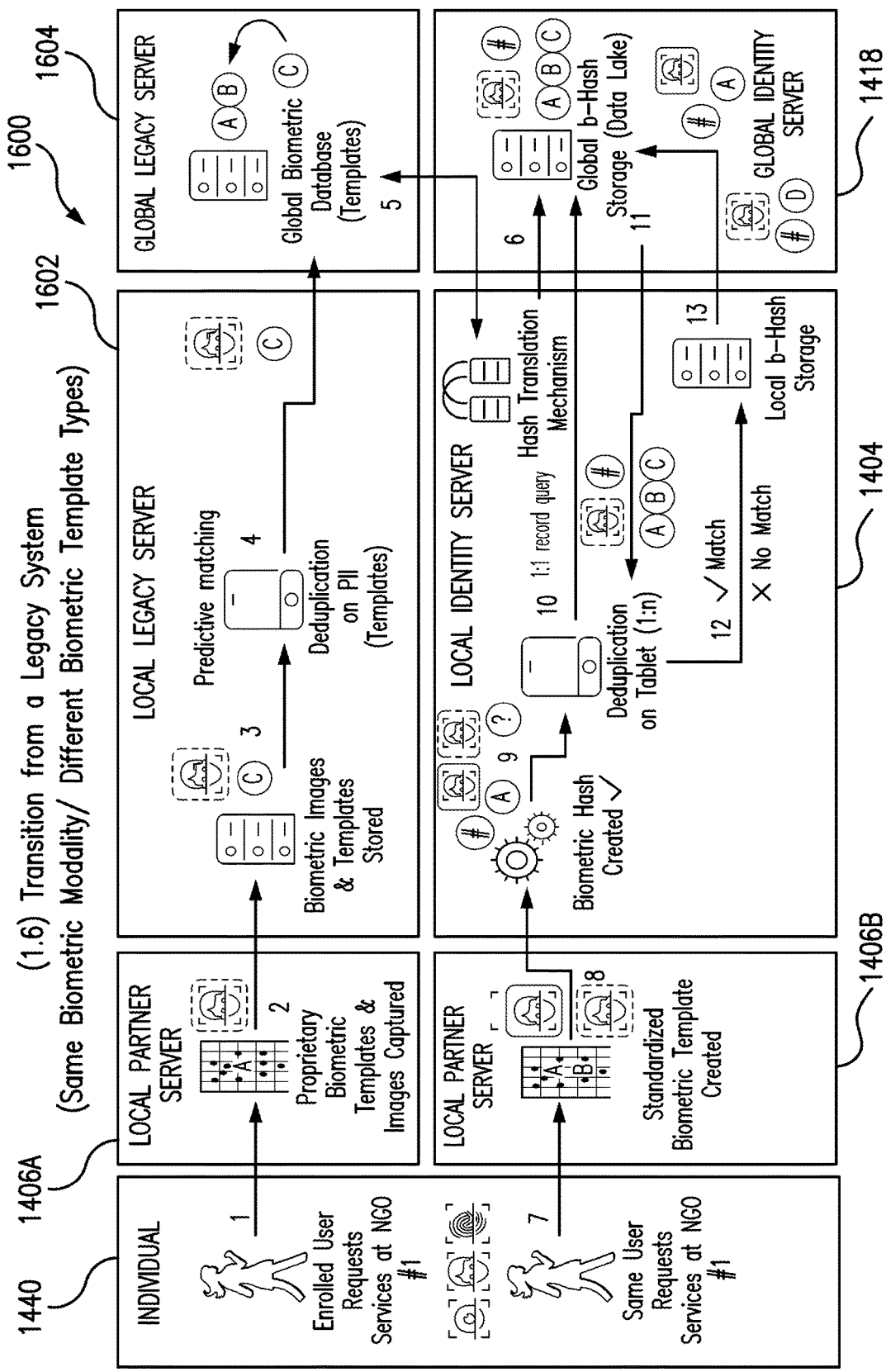
FIG. 16 illustrates another example implementation of the identity network/switch of FIG. 14.

FIG. 16 illustrates another example implementation of the identity network/switch 1402 of FIG. 14. In the example of FIG. 16, the individual 1440 has previously enrolled in a program or service offered by a partner via the local partner server 1406A. For example, the individual 1440 has previously visited the partner to access the partner computer 135A and enroll in a service.

The local partner server 1406A captured the registration of the individual 1440 and output the registration information to the local legacy server 1602 (e.g., one of the legacy servers 1408 as described above in FIG. 14). The individual 1440 also indicated consent to the local partner server 1406A and/or the local legacy server 1602.

As part of registering, the individual 1440 provided biometric data associated with the individual 1440. For example, the individual 1440 underwent a facial scan, a fingerprint scan, an iris scan, or other suitable biometric scan. The biometric data associated with the individual 1440 is transformed into a proprietary biometric template at the local partner server 1406A based on the proprietary form issued by the local legacy server 1602. The proprietary biometric template, the biometric data, and the registration information is output by the local partner server 1406A to the local legacy server 1602.

The local legacy server 1602 captured the proprietary biometric template, the biometric data, and the registration information. The local legacy server 1602 performed de-duplication using predictive matching of personally identifiable information (PII) to determine whether the proprietary biometric template matches any existing proprietary biometric templates stored in the local legacy server 1602. After checking against existing proprietary biometric templates in the database of the local legacy server 1602, the local legacy server 1602 outputs the proprietary biometric template to the global legacy server 1604.

In the example of FIG. 15, after storing the proprietary biometric template, the global legacy server 1604 outputs the proprietary biometric template to the local identity server 1404. The local identity server 1404 uses a hash translation service (as described above in FIG. 14) to translate the proprietary biometric template into a biometric hash. In some examples, the local identity server 1404 transmits the biometric hash to the global identity server 1418, and the global identity server 1418 stores the biometric hash in the database 126.

However, in some examples, to translate the proprietary biometric template into a biometric hash, the local identity server 1404 adjusts the proprietary biometric template into a standards-based and "hash-friendly" template that allows for transformation into a biometric hash. In other words, the proprietary aspect of the proprietary biometric template may need to be removed by the local identity server 1404 to create a "hash-friendly" biometric template that may be hashed by the local identity server 1404. Although the hash translation service is described with respect to the local identity server 1404, the hash translation service may be implemented by any of the servers that store or use the proprietary biometric template.

Additionally, in the example of FIG. 15, the individual 1440 requests enrollment in a program or service offered by a second partner via the local partner server 1406B. For example, the individual 1440 may visit the second partner to access the partner computer 135B and enroll.

The local partner server 1406B captures the registration of the individual 1440 and outputs the registration information to the local identity server 1404. The individual 1440 also indicates consent to the local partner server 1406B and/or the local identity server 1404.

As part of registering, the individual 1440 provides biometric data associated with the individual 1440. For example, the individual 1440 undergoes a facial scan, a fingerprint scan, an iris scan, or other suitable biometric scan. Additionally, in some examples, the individual 1440 may provide an existing proprietary biometric template to the local partner server 1406B via a pre-existing individual resource (e.g., an identity card). The biometric data associated with the individual 1440 is transformed into a standardized biometric template. The standardized biometric template, the registration information, and the existing proprietary biometric template are output by the local partner server 1406B to the local identity server 1404. The local identity server 1404 captures the standardized biometric template, the registration information, and the existing proprietary biometric template. The local identity server 1404 generates a biometric hash based on the standardized biometric template and clears the standardized biometric template and any biometric data associated with the individual 1440 from temporary memory. For example, the local identity server 1404 may use the Trust Stamp™ technology to generate the biometric hash from the standardized biometric template created by the local partner server 1406B.

After successfully generating the biometric hash and in response to receiving the existing proprietary biometric template, the local identity server 1404 performs a record query (i.e., a 1:1 record query for 1:n predictive match) regarding the individual 1440. The global identity server 1418 outputs any similar biometric hashes to the local identity server 1404. Additionally, in some examples, the local identity server 1404 may use the hash translation service to translate the existing proprietary biometric template into a biometric hash as described above.

The local identity server 1404 performs de-duplication using predictive matching to determine whether the biometric hash (or biometric hashes) matches any existing biometric hashes stored in the database 114 and the biometric hashes received from the global identity server 1418. For example, the local identity server 1404 may use the Trust Stamp™ technology to perform predictive matching to determine whether the biometric hash (or biometric hashes) matches any existing biometric hashes stored in the database 114 and the biometric hashes received from the global identity server 1418.

In one example, after checking against existing biometric hashes in the database 114 and the biometric hashes received from the global identity server 1418, the local identity server 1404 finds no match and generates a new global unique identifier (GUID) associated with the individual 1440 and stores the GUID and the biometric hash in the database 114. In another example, after checking against existing biometric hashes in the database 114 and the biometric hashes received from the global identity server 1418, the local identity server 1404 finds a match and stores the biometric hash, the existing hashes match, and the existing GUID associated with the individual 1440 in the database 114.

After storing all of the information associated with the individual 1440 in the database 114, the local identity server 1404 may transmit the biometric hash to the global identity server 1418 via the network 160. In other words, when "online," the local identity server 1404 sends "matched" biometric hashes to the global identity server 1418.

After receiving the biometric hash from the local identity server 1404, the global identity server 1418 may simply store the biometric hash associated with the individual 1440. In other examples, after receiving the biometric hash from the local identity server 1404, the global identity server 1418 may perform a global de-duplication using predictive matching to determine whether the biometric hash matches any existing biometric hashes stored in the global database 126. After performing the global de-duplication and finding a match, the global identity server 1418 stores the biometric hash associated with the individual 1440.

In the example of FIG. 16, the identity network/switch 1402 of FIG. 14 is the interconnection between the local partner servers 1406A and 1406B, the local identity server 1404, the local legacy server 1602, the global legacy server 1604, and the global identity server 1418. With the above-noted interconnection, the local identity server 1404 continuously updates the database 114 when the individual 1440 requests a service from the first partner or the second partner. Additionally, in some examples, the global identity server 1418 also continuously updates the database 126 when the individual 1440 requests a service from the first partner or the second partner. By continually updating the database 126 and the database 114, the local identity server 1404 and the global identity server 1418 may continue to accurately identify the individual 1440 even as the biometric data of the individual 1440 changes over time. For example, the local identity server 1404 and the global identity server 1418 may accurately identify the individual 1440 even as the individual 1440 ages over time.

Figure 17:
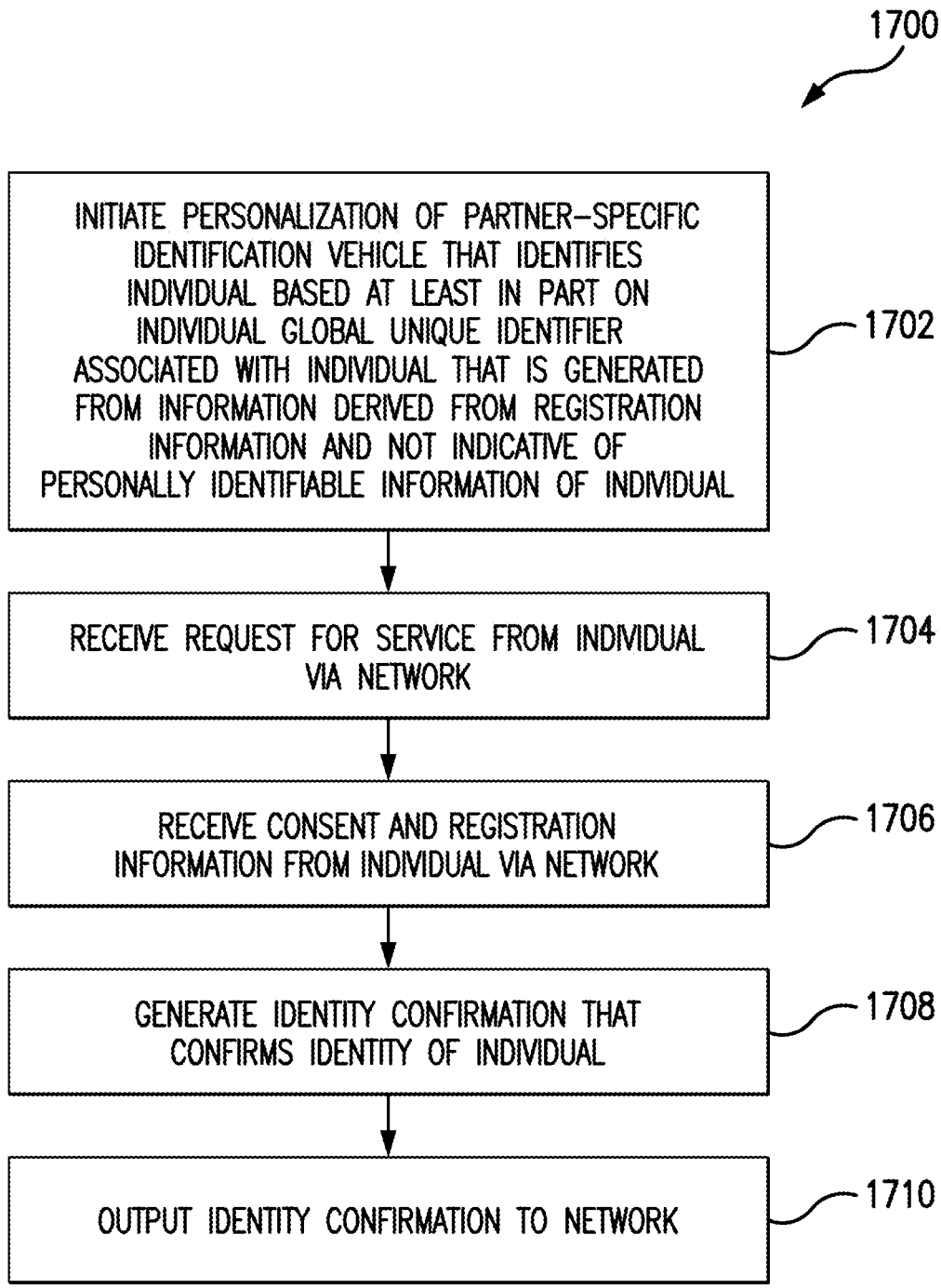
FIG. 17 is a flowchart illustrating one example method for securely identifying an individual with the example system of FIG. 1.

FIG. 17 is a flowchart illustrating one example method 1700 for securely identifying an individual with the local identity server 104 in the example system 100 of FIG. 1. FIG. 17 is described with respect to FIG. 1.

The method 1700 includes initiating, with the local identity server 104, a personalization of a partner-specific identification vehicle that identifies the individual 140 based at least in part on an individual global unique identifier associated with the individual 140 (at block 1702). The method 1700 includes receiving, with the local identity server 104, a request for a service from the individual 140 via the network 160 (at block 1704). The method 1700 includes receiving, with the local identity server 104, consent and registration information from the individual 140 via the network 160 (at block 1706). The method 1700 includes generating, with the local identity server 104, an identity confirmation that confirms an identity of the individual 140 (at block 1708). The method 1700 also includes outputting, with the local identity server 104, the identity confirmation to the network 160 (at block 1710). In this example of the method 1700, the individual global unique identifier is generated from information derived from the registration information, and the individual global unique identifier is not indicative of personally identifiable information of the individual.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It should thus be noted that the matter contained in the above description or shown in the accompanying drawings is to be interpreted as illustrative and not in a limiting sense.

What is claimed is:

1. A system for securely identifying an individual, the system comprising:
   a local identity server including a first electronic processor, a first communication interface, and a first memory, the first electronic processor is configured to
      initiate a personalization of a partner-specific identification vehicle that identifies the individual based at least in part on an individual global unique identifier associated with the individual,
      receive a request for a service from the individual via the first communication interface,
      receive consent and registration information from the individual via the first communication interface,
      generate an identity confirmation that confirms an identity of the individual, and
      output the identity confirmation via the first communication interface,
   wherein the individual global unique identifier is generated from information derived from the registration information, and
   wherein the individual global unique identifier is not indicative of personally identifiable information of the individual; and
   a local partner server including a second electronic processor, a second communication interface, and a second memory that are communicatively connected to each other, the second electronic processor is configured to
      receive the request for the service from the individual,
      output the consent and the registration information from the individual via the second communication interface,
      receive the identity confirmation via the second communication interface, and
      approve the request for the service from the individual based on the identity confirmation,
   wherein the first communication interface and the second communication interface communicate with each other over a network, and
   wherein the first electronic processor is configured to
      translate a first biometric template into a biometric hash,
      perform de-duplication to determine whether the biometric hash matches any other biometric hashes,
      associate the biometric hash with the individual global unique identifier that is assigned to the individual in response to determining that the biometric hash matches a different biometric hash that is already associated with the individual, and
      output the identity confirmation via the first communication interface in response to associating the biometric hash with the individual global unique identifier.

2. The system of claim 1, further comprising:
   one or more legacy servers, each of the one or more legacy servers including a third electronic processor, a third communication interface, and a legacy database that are communicatively connected to each other,
   wherein the second electronic processor is further configured to
      receive the first biometric template of the individual from the partner-specific identification vehicle that is assigned to the individual,
      generate a second biometric template of the individual based on the registration information,
      output the first biometric template of the individual and the second biometric template of the individual via the second communication interface,
   wherein the first electronic processor is further configured to
      receive the first biometric template and the second biometric template via the first communication interface,
      determine whether the first biometric template is associated with one of the one or more legacy servers, and
      output the first biometric template to the one of the one or more legacy servers via the first communication interface in response to determining that the first biometric template is associated with the one of the one or more legacy servers, and
   wherein the first communication interface, the second communication interface, the third communication interface communicate with each other over the network.

3. The system of claim 2, further comprising:
   a global identity server including a fourth electronic processor, a fourth communication interface, and a fourth memory that are communicatively connected to each other,
   wherein the first electronic processor is further configured to output the first biometric template via the first communication interface, and
   wherein the fourth electronic processor is configured to receive the first biometric template via the fourth communication interface, translate the first biometric template into a second biometric hash, perform de-duplication to determine whether the second biometric hash matches any other biometric hashes, associate the biometric hash with the individual global unique identifier that is assigned to the individual in response to determining that the second biometric hash matches the different biometric hash that is already associated with the individual, store the second biometric hash in the fourth memory in response to associating the second biometric hash with the individual global unique identifier, and output the identity confirmation via the fourth communication interface in response to associating the second biometric hash with the individual global unique identifier.

4. The system of claim 1, wherein the first electronic processor is configured to store the biometric hash in the first memory in response to associating the biometric hash with the individual global unique identifier.

5. The system of claim 1, further comprising:

a global identity server including a third electronic processor, a third communication interface, and a third memory that are communicatively connected to each other, wherein the second electronic processor is further configured to receive the first biometric template of the individual from the partner-specific identification vehicle that is assigned to the individual, generate a second biometric template of the individual based on the registration information, output the first biometric template of the individual and the second biometric template of the individual via the second communication interface, wherein the first electronic processor is further configured to generate a second biometric hash based on the second biometric template, and output the first biometric template and the second biometric hash via the first communication interface, and wherein the third electronic processor is configured to receive the first biometric template and the second biometric hash via the third communication interface, translate the first biometric template into a third biometric hash, perform de-duplication to determine whether the second biometric hash and the third biometric hash match any other biometric hashes, associate the second biometric hash and the third biometric hash with the individual global unique identifier that is assigned to the individual in response to determining that the seconds biometric hash and the third biometric hash match the different biometric hash that is already associated with the individual, store the second biometric hash and the third biometric hash in the third memory in response to associating the second biometric hash and the third biometric hash with the individual global unique identifier, and output the identity confirmation via the third communication interface in response to associating the second biometric hash and the third biometric hash with the individual.

6. The system of claim 5, wherein the third biometric hash is similar to the biometric hash.

7. The system of claim 1, wherein the second electronic processor is further configured to receive the first biometric template of the individual from the partner-specific identification vehicle that is assigned to the individual, generate a second biometric template of the individual based on the registration information, output the first biometric template of the individual and the second biometric template of the individual via the second communication interface, and wherein the first electronic processor is configured to generate a second biometric hash based on the second biometric template, translate the first biometric template into a third biometric hash, perform de-duplication to determine whether the second biometric hash and the third biometric hash match any other biometric hashes, associate the second biometric hash and the third biometric hash with the individual global unique identifier that is assigned to the individual in response to determining that the second biometric hash and the third biometric hash match the different biometric hash that is already associated with the individual, store the second biometric hash and the third biometric hash in the first memory in response to associating the second biometric hash and the third biometric hash with the individual global unique identifier, and output the identity confirmation to the local partner server via the first communication interface in response to associating the second biometric hash and the third biometric hash with the individual global unique identifier.

8. The system of claim 7, wherein the third biometric hash is similar to the biometric hash.

9. The system of claim 1, wherein the second electronic processor is further configured to generate a biometric template of the individual based on the registration information, and output the biometric template of the individual via the second communication interface.

10. The system of claim 9, wherein the first electronic processor is configured to receive the biometric template via the first communication interface, generate a second biometric hash based on the biometric template, perform de-duplication to determine whether the second biometric hash matches any other biometric hashes, associate the second biometric hash with the individual global unique identifier that is assigned to the individual in response to determining that the second biometric hash matches the different biometric hash that is already associated with the individual, store the second biometric hash in the first memory in response to associating the biometric hash with the individual global unique identifier, and output the identity confirmation via the first communication interface in response to associating the second biometric hash with the individual global unique identifier.

11. The system of claim 9, further comprising:
a global identity server including a third electronic processor, a third communication interface, and a third memory that are communicatively connected to each other,
wherein the first electronic processor is further configured to
receive the biometric template via the first communication interface,
generate a second biometric hash based on the biometric template, and
output the second biometric hash via the first communication interface, wherein the third electronic processor is configured to
receive the second biometric hash via the third communication interface,
perform de-duplication to determine whether the second biometric hash matches any other biometric hashes,
associate the second biometric hash with the individual global unique identifier that is assigned to the individual in response to determining that the second biometric hash matches the different biometric hash that is already associated with the individual,
store the second biometric hash in the third memory in response to associating the second biometric hash with the individual global unique identifier, and
output the identity confirmation to the local partner server via the third communication interface in response to associating the second biometric hash with the individual global unique identifier, and
wherein the first communication interface, the second communication interface, the third communication interface communicate with each other over the network.

12. A method for securely identifying an individual, the method comprising:
initiating, with a local identity server, a personalization of a partner-specific identification vehicle that identifies the individual based at least in part on an individual global unique identifier associated with the individual;
receiving, with the local identity server, a request for a service from the individual via a network;
receiving, with the local identity server, consent and registration information from the individual via the network;
generating, with the local identity server, an identity confirmation that confirms an identity of the individual; and
outputting, with the local identity server, the identity confirmation to the network;
receiving, with a local partner server, the request for the service from the individual;
outputting, with the local partner server, the consent and the registration information from the individual to the network;
receiving, with the local partner server, the identity confirmation via the network;
approving, with the local partner server, the request for the service from the individual based on the identity confirmation;
translating, with the local identity server, a first biometric template into a biometric hash,
performing, with the local identity server, de-duplication to determine whether the biometric hash matches any other biometric hashes;
associating, with the local identity server, the biometric hash with the individual global unique identifier that is assigned to the individual in response to determining that the biometric hash matches a different biometric hash that is already associated with the individual; and
outputting, with the local identity server, the identity confirmation to the network in response to associating the biometric hash with the individual global unique identifier,
wherein the local identity server and the local partner server communicate with each other over the network,
wherein the individual global unique identifier is generated from information derived from the registration information, and
wherein the individual global unique identifier is not indicative of personally identifiable information of the individual.

13. The method of claim 12, further comprising:
receiving, with the local partner server, the first biometric template of the individual from the partner-specific identification vehicle that is assigned to the individual;
generating, with the local partner server, a second biometric template of the individual based on the registration information;
outputting, with the local partner server, the first biometric template of the individual and the second biometric template of the individual to the network;
receiving, with the local identity server, the first biometric template and the second biometric template via the network;
determining, with the local identity server, whether the first biometric template is associated with one of one or more legacy servers; and
outputting, with the local identity server, the first biometric template to the one of the one or more legacy servers via the network in response to determining that the first biometric template is associated with the one of the one or more legacy servers;
wherein the local identity server, the local partner server, and one or more legacy servers communicate with each other via the network, and
wherein each of the one or more legacy servers includes a legacy database.

14. The method of claim 13, further comprising:
outputting, with the local identity server, the first biometric template to the network;
receiving, with a global identity server, the first biometric template via the network;
translating, with the global identity server, the first biometric template into a second biometric hash;
performing, with the global identity server, de-duplication to determine whether the second biometric hash matches any other biometric hashes;
associating, with the global identity server, the second biometric hash with the individual global unique identifier that is assigned to the individual in response to determining that the second biometric hash matches the different biometric hash that is already associated with the individual;
storing, with the global identity server, the second biometric hash in a memory in response to associating the biometric hash with the individual global unique identifier; and
outputting, with the global identity server, the identity confirmation to the network in response to associating the second biometric hash with the individual global unique identifier.

15. The method of claim 12, further comprising:
storing, with the local identity server, the biometric hash in a memory in response to associating the biometric hash with the individual global unique identifier.

16. The method of claim 12, further comprising:
receiving, with the local partner server, the first biometric template of the individual from the partner-specific identification vehicle that is assigned to the individual;
generating, with the local partner server, a second biometric template of the individual based on the registration information;
outputting, with the local partner server, the first biometric template of the individual and the second biometric template of the individual to the network;
generating, with the local identity server, a second biometric hash based on the second biometric template;
outputting, with the local identity server, the first biometric template and the second biometric hash to the network;
receiving, with a global identity server, the first biometric template and the second biometric hash via the network;
translating, with the global identity server, the first biometric template into a second third biometric hash;
performing, with the global identity server, de-duplication to determine whether the second biometric hash and the third biometric hash match any other biometric hashes;
associating, with the global identity server, the second biometric hash and the third biometric hash with the individual global unique identifier that is assigned to the individual in response to determining that the second biometric hash and the third biometric hash match the different biometric hash that is already associated with the individual;
storing, with the global identity server, the second biometric hash and the third biometric hash in a memory in response to associating the second biometric hash and the third biometric hash with the individual global unique identifier; and
outputting, with the global identity server, the identity confirmation to the network in response to associating the second biometric hash and the third biometric hash with the individual.

17. The method of claim 16, wherein the third biometric hash is similar to the biometric hash.

18. The method of claim 12, further comprising:
receiving, with the local partner server, the first biometric template of the individual from the partner-specific identification vehicle that is assigned to the individual;
generating, with the local partner server, a second biometric template of the individual based on the registration information;
outputting, with the local partner server, the first biometric template of the individual and the second biometric template of the individual to the network;
generating, with the local identity server, a second biometric hash based on the second biometric template;
translating, with the local identity server, the first biometric template into a third biometric hash;
performing, with the local identity server, de-duplication to determine whether the second biometric hash and the third biometric hash match any other biometric hashes;
associating, with the local identity server, the second biometric hash and the third biometric hash with the individual global unique identifier that is assigned to the individual in response to determining that the second biometric hash and the third biometric hash match the different biometric hash that is already associated with the individual;
storing, with the local identity server, the second biometric hash and the third biometric hash in a memory in response to associating the second biometric hash and the third biometric hash with the individual global unique identifier; and
outputting, with the local identity server, the identity confirmation to the local partner server to the network in response to associating the second biometric hash and the third biometric hash with the individual global unique identifier.

19. The method of claim 1, further comprising:
generating, with the local partner server, a biometric template of the individual based on the registration information; and
outputting, with the local partner server, the biometric template of the individual to the network.

20. The method of claim 19, further comprising:
receiving, with the local identity server, the biometric template via the network;
generating, with the local identity server, a second biometric hash based on the biometric template;
performing, with the local identity server, de-duplication to determine whether the second biometric hash matches any other biometric hashes;
associating, with the local identity server, the second biometric hash with the individual global unique identifier that is assigned to the individual in response to determining that the second biometric hash matches the different biometric hash that is already associated with the individual;
storing, with the local identity server, the second biometric hash in a memory in response to associating the second biometric hash with the individual global unique identifier; and
outputting, with the local identity server, the identity confirmation to the network in response to associating the second biometric hash with the individual global unique identifier.

21. The method of claim 19, further comprising:
receiving, with the local identity server, the biometric template via the network;
generating, with the local identity server, a second biometric hash based on the biometric template;
outputting, with the local identity server, the second biometric hash to the network;
receiving, with a global identity server, the second biometric hash via the network;
performing, with the global identity server, de-duplication to determine whether the second biometric hash matches any other biometric hashes;
associating, with the global identity server, the second biometric hash with the individual global unique identifier that is assigned to the individual in response to determining that the second biometric hash matches the different biometric hash that is already associated with the individual;
storing, with the global identity server, the second biometric hash in a memory in response to associating the second biometric hash with the individual global unique identifier; and
outputting, with the global identity server, the identity confirmation to the local partner server to the network in response to associating the second biometric hash with the individual global unique identifier.

* * * * *